United States Patent

Bruner et al.

[11] Patent Number: 6,104,565
[45] Date of Patent: *Aug. 15, 2000

[54] SYSTEM ARCHITECTURE FOR HARD DISK DRIVE

[75] Inventors: Curt Bruner; Larry Hutsell; Jeff Reh, all of Longmont; Robert Metz, Westminister, all of Colo.

[73] Assignee: Maxtor Corporation, Longmont, Colo.

[ * ] Notice: This patent is subject to a terminal disclaimer.

[21] Appl. No.: 09/223,201

[22] Filed: Dec. 30, 1998

Related U.S. Application Data

[63] Continuation of application No. 08/762,944, Dec. 10, 1996, Pat. No. 5,914,828, which is a continuation of application No. 08/401,670, Mar. 10, 1995, Pat. No. 5,594,600, which is a continuation of application No. 08/089,228, Jul. 8, 1993, abandoned.

[51] Int. Cl.[7] .................................................. G11B 19/02
[52] U.S. Cl. ............................................................ 360/69
[58] Field of Search .................................. 360/69, 70, 71, 360/75, 137

[56] References Cited

U.S. PATENT DOCUMENTS

| | | | |
|---|---|---|---|
| 4,933,785 | 6/1990 | Morehouse et al. | 360/78.04 |
| 4,979,056 | 12/1990 | Squires et al. | 360/69 |
| 5,025,335 | 6/1991 | Stefansky | 360/137 X |
| 5,025,336 | 6/1991 | Morehouse et al. | 360/97.02 |
| 5,140,477 | 8/1992 | Hashimoto . | |
| 5,396,596 | 3/1995 | Hashemi et al. | 711/113 |
| 5,594,600 | 1/1997 | Bruner et al. | 360/69 |

FOREIGN PATENT DOCUMENTS

| | | |
|---|---|---|
| 0535991 A1 | 4/1993 | European Pat. Off. . |
| 91/02354 | 2/1991 | WIPO . |

*Primary Examiner*—Glenton B. Burgess
*Assistant Examiner*—James L Habermehl
*Attorney, Agent, or Firm*—David M. Sigmond

[57] ABSTRACT

An electronic architecture that provides a portable hard disk drive that can meet the type II PCMCIA specification and which can efficiently operate with a 3.3 V power supply. The architecture includes a digital signal processor with a first internal bus for transferring instructions and a second internal bus for transferring data. The digital signal processor performs fetching, decoding, reading and execution routines in parallel while simultaneously receiving data.

20 Claims, 14 Drawing Sheets

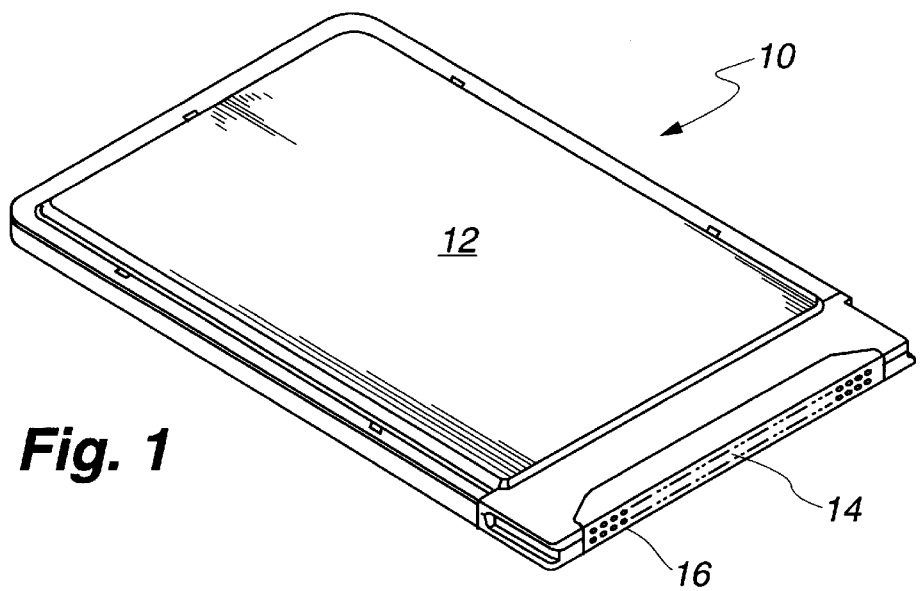
Fig. 1
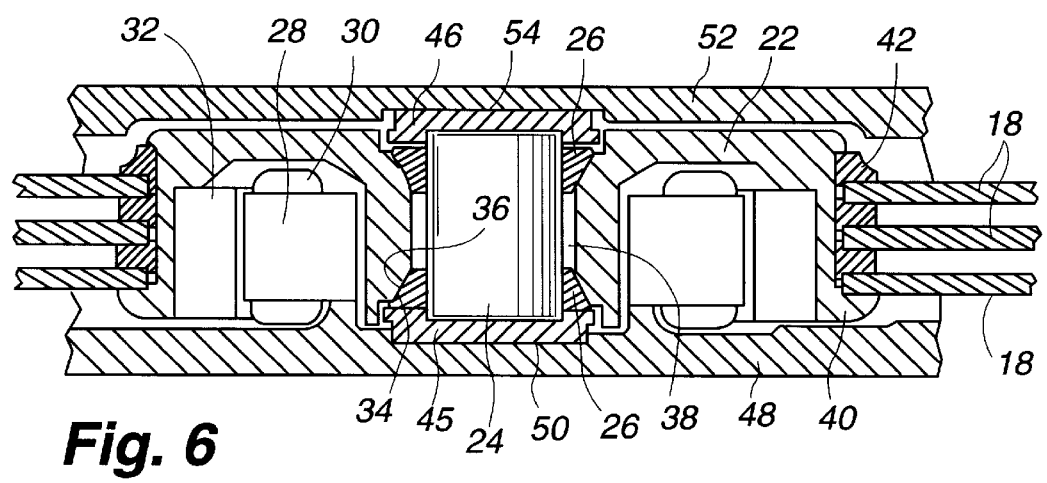
Fig. 6
Fig. 7
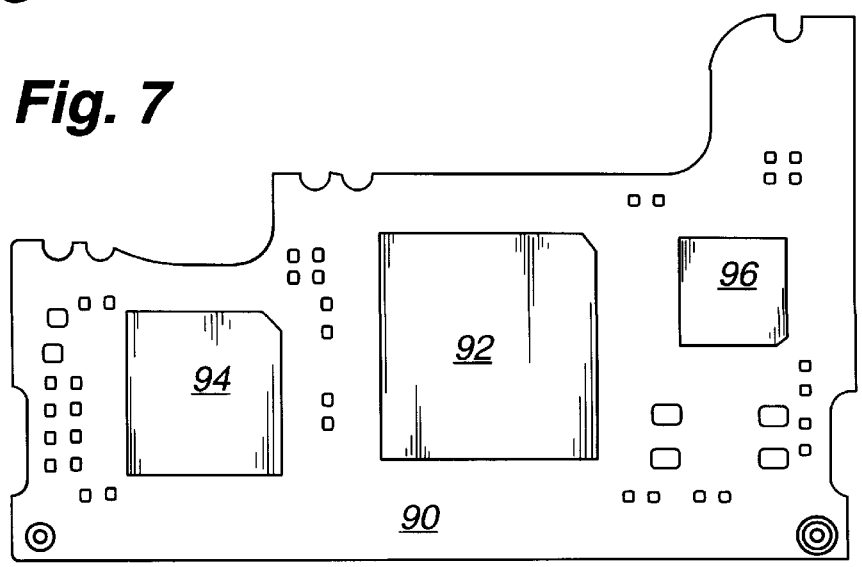

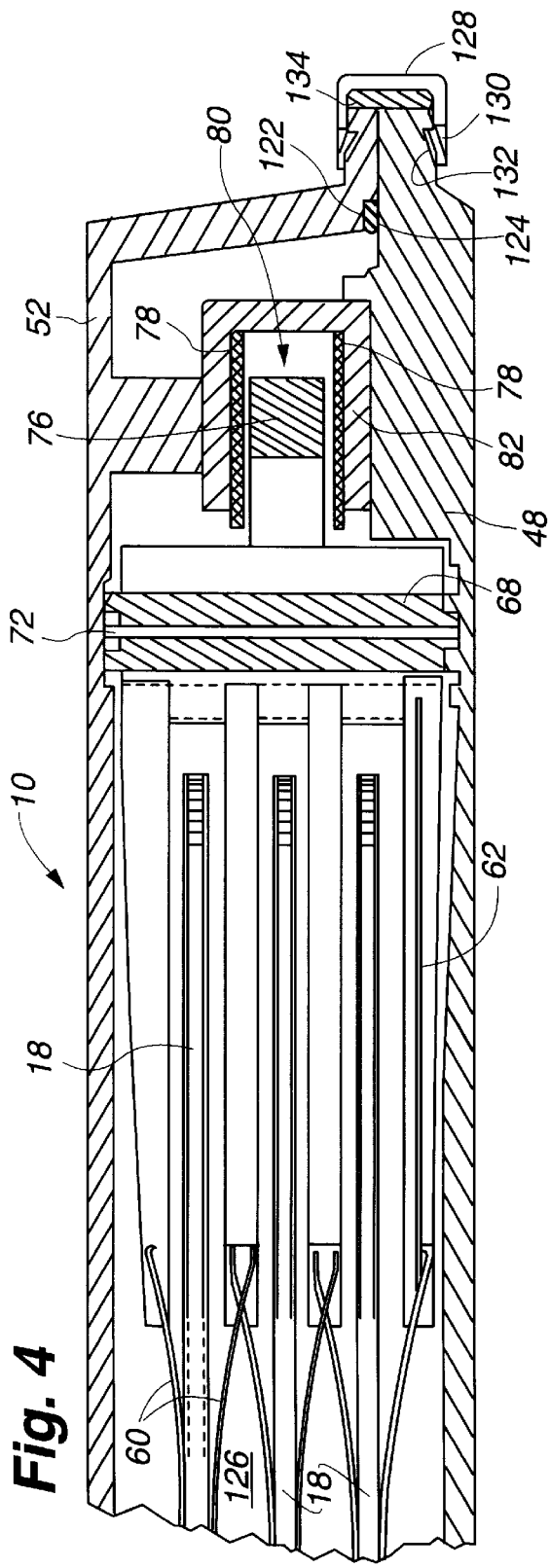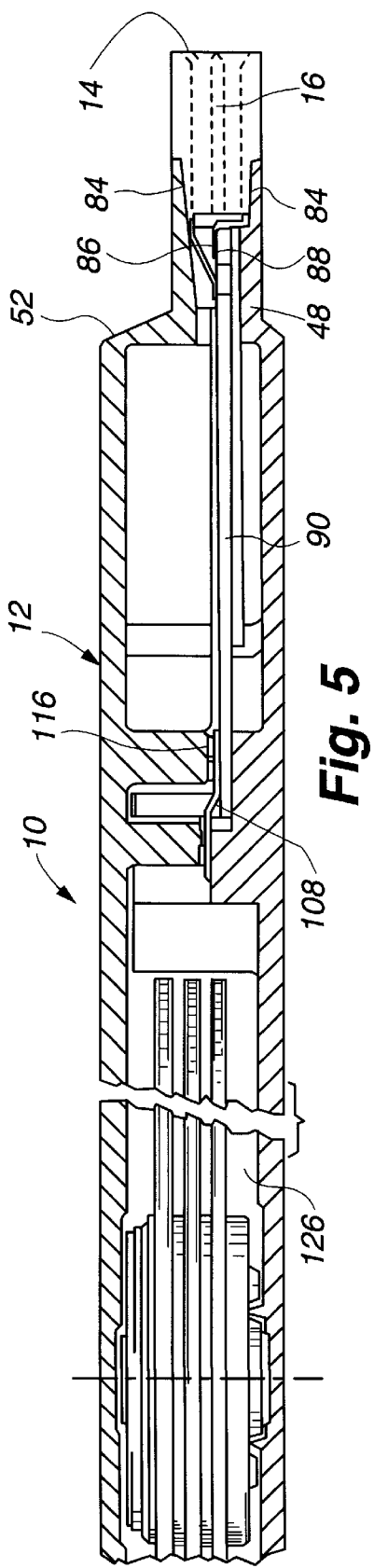

SYSTEM ARCHITECTURE FOR HARD DISK DRIVE

CROSS-REFERENCE TO RELATED APPLICATIONS

This application is a continuation of U.S. application Ser. No. 08/762,944, filed Dec. 10, 1996 (U.S. Pat. No. 5,914,828), which is a continuation of U.S. application Ser. No. 08/401,670, filed Mar. 10, 1995 (U.S. Pat. No. 5,594,600), which is a continuation of U.S. application Ser. No. 08/089,228, filed Jul. 8, 1993 (abandoned).

BACKGROUND OF THE INVENTION

1. Field of the Invention

The present invention relates to an electronic architecture for a hard disk drive.

2. Description of Related Art

Most computer systems contain a massive memory storage device such as a hard disk drive. Hard disk drive units include a magnetic disk that is capable of storing a large amount of binary information. The magnetic disk is typically coupled to a hub that is rotated by an electric motor, commonly referred to as a spin motor. The drive unit also has a head that magnetizes and senses the magnetic field of the disk. The head is typically located at the end of a cantilevered actuator arm which can pivot about a bearing assembly mounted to the base plate of the disk drive. The actuator arm has a coil which cooperates with a magnet mounted to the base plate. Providing a current to the coil creates a torque on the arm and moves the head relative to the disk. The coil and magnet are commonly referred to as a voice coil motor or VCM. The actuator arm, motors and other components of a typical disk drive unit are relatively small and fragile, and are therefore susceptible to damage when subjected to excessive external shock loads or vibration. For this reason, hard disk drives are usually rigidly mounted to the housing of the computer system by screws or other fastening means.

Hard disk drives contain programs and other information that are vital to the user. It is sometimes desirable to transfer such information to a different computer system. Transferring programs from a hard disk drive typically requires loading the information onto a floppy disk, or sending such information over a phone line. Such methods can be time consuming, particularly if the program is long, or there is a large amount of data. There have been developed portable hard disk drives which can be plugged into a slot in the computer. To reduce the amount of possible component damage to the drive unit, the housing and disk assembly are constructed to be quite rugged. These rugged assemblies are typically heavy and bulky, and generally impractical to carry and store.

The Personal Computer Memory Card International Association (PCMCIA) has recently promulgated specifications for portable memory cards which can be plugged into slots within a computer. The PCMCIA standard includes a type I format, a type II format and a type III format, each format being distinguished by a different card thickness. Memory can be added to a computer by merely plugging in an additional card. Similarly, a modem or facsimile (FAX) card can be added to a system with the push of the hand. The standardized format of the cards allows a user to plug the memory card of one computer into another computer, regardless of the type or make of either system.

The standardized PCMCIA cards are approximately the size of a credit card and include a connector which mates with a corresponding connector in the computer. The small size of the card provides an electronic assembly that is easy to carry and store. It is very desirable to have a hard disk drive unit which conforms with the PCMCIA format, so that the disk drive can be readily carried and plugged into an existing slot of a computer. Such a hard disk card must be rugged enough to withstand the large shock loads that may be applied to the drive unit, such as by dropping the card onto a hard surface. The existence of such a card would also allow the user to accumulate memory in the same manner that floppy disks are used today.

Hard disk drive units contain a number of integrated circuits that control the operation of the drive. The circuits typically include a read/write channel that is coupled to the heads of the actuator arm assembly. The read/write channel is connected to an interface controller which is coupled to the host computer. The interface controller is coupled to a random access memory device that is used as a buffer to store data transferred between the disk and the host.

Disk drives also contain circuitry that provide current to the voice coil motor to maintain the head(s) on the center of a track (servo routine) and to move the head(s) from track to track (seek routine). Additionally, a disk drive typically contains circuitry to commutate the spin motor, and to insure that the spin motor and disk rotate at a uniform speed.

The operation of the above described circuits is typically controlled by a microprocessor based controller. Conventional disk drives also contain a separate circuit which interfaces the controller with the other circuits. This chip is commonly referred to as glue logic. U.S. Pat. No. 4,979,056 issued to Squires et al. discloses a hard disk architecture which has a microprocessor based controller that controls the operation of the interface controller, read/write channel, actuator and spin motor circuitry. The Squires system utilizes an embedded servo format which stores the servo information in the same sector of a track as the data. During each sector the processor services the voice coil motor and spin motor circuitry of the drive. The processor employs a hierarchy that allows the spin motor and the voice coil motor to be serviced in conjunction with the transfer of data between the host computer and the disk. Although a Squires type system provides a controller based system to efficiently transfer data between the disk and the host, such systems typically require a large amount of electrical components that must be mounted onto a printed circuit board.

U.S. Pat. No. 4,933,785 issued to Morehouse et al. and U.S. Pat. No. 5,025,335 issued to Stefansky et al. disclose conventional hard disk drives which have a printed circuit board mounted to a disk drive housing commonly referred to as a head disk assembly (HDA). The HDA is typically sealed and contains the disk, actuator arm and spin motor of the assembly. The HDA may also contain a pre-amplifier that is connected to the heads of the drive. The remaining electrical components (interface controller, read/write channel, actuator circuitry, etc.) are located on the external printed circuit board. The circuit board extends along the entire length and width of the HDA. Therefore the thickness of the overall assembly is determined by the thickness of the HDA, the thickness of the printed circuit board and the height of the electrical components.

application Ser. No. 07/975,008 filed on Nov. 13, 1992 and assigned to the same assignee as the present application, discloses a hard disk drive which contains a 1.8 inch diameter disk and meets the type III requirements of the PCMCIA specifications. Like the Morehouse and Stefansky patents, the '008 application contains a printed circuit board that extends across the length and width of the HDA. It has been found that using such a board arrangement will not provide a disk drive that meets the type II PCMCIA specification. It is desirable to provide a hard disk drive assembly which meets the type II PCMCIA specifications.

Portable disk drives that meet the PCMCIA specifications can be used in portable laptop computers. Some laptop computers are designed to run on a 3.3 V power supply. Conventional computer electronics are designed to operate with a 5.0 V power supply. It has been found that it takes more time to access a volatile memory device that is supplied with only 3.3 V of power. The longer access time slows down the performance of any processor that is utilizing the memory device. It would therefore be desirable to have an electronic architecture for a hard disk drive which can run on 3.3 V without degrading the performance of the drive.

SUMMARY OF THE INVENTION

The present invention is an electronic architecture which can be entirely contained within a hard disk drive that meets the type II PCMCIA specifications. The disk drive contains a low profile spin motor that rotates a disk. The rotation of the spin motor is controlled by spin motor circuitry within a servo chip. The disk rotates relative to an actuator arm assembly which has heads that write to and retrieve information from the disk. The actuator arm is rotated by a voice coil motor that is controlled by actuator circuitry within the servo chip.

The disk drive has an outer housing and a connector which allows the drive to be plugged into a host computer. The heads are coupled to a read/write chip which transfers information between the disk and the host computer through a data manager chip. The data manager, read/write and servo chips are all controlled by a controller chip. All of the electrical components of the drive are mounted to a single printed circuit board. The circuit board is approximately one-third the length of the housing and is located between the disk and the connector. The reduction in board length allows the circuit board to be placed in the same plane as the disk and therefore does not add to the thickness of the overall assembly. The compact assembly provides a hard disk drive which meets the type II PCMCIA thickness requirements.

The controller chip contains a core processor and a state machine that controls the operation of the drive. The core microprocessor is a product commonly referred to as a reduced instruction set chip ("RISC") which has a dual bus architecture that allows the processor to execute fetching, decoding, reading and execution routines in parallel. The processor of the present invention requires fewer memory fetches for a given function than processors used in hard disk drives of the prior art. The reduction in memory fetches allows the overall system to be used in a system that contains a 3.3 V power supply.

It is therefore an object of the present invention to provide a hard disk drive that will meet the type II PCMCIA specifications.

It is also an object of the present invention to provide an electronic architecture which will reduce the size of the printed circuit board of a hard disk drive assembly.

It is also an object of the present invention to provide an electronic architecture for a hard disk drive that can operate with a 3.3 V power supply.

A feature of the present invention is a disk drive that includes a digital signal processor with a first internal bus for transferring instructions and a second internal bus for transferring data. The digital signal processor performs fetching, decoding, reading and execution routines in parallel while simultaneously receiving data.

BRIEF DESCRIPTION OF THE DRAWINGS

The objects and advantages of the present invention will become more readily apparent to those ordinarily skilled in the art after reviewing the following detailed description and accompanying drawings, wherein:

FIG. 1 is a perspective view of a hard disk drive of the present invention;

FIG. 4 is a cross-sectional view of the actuator arm assembly;

FIG. 5 is a cross-sectional view of the hard disk drive showing the printed circuit board and the connector of the drive;

FIG. 6 is a cross-sectional view of the spin motor;

FIG. 7 is a bottom view of the printed circuit board;

DETAILED DESCRIPTION OF THE INVENTION

Figure 2:
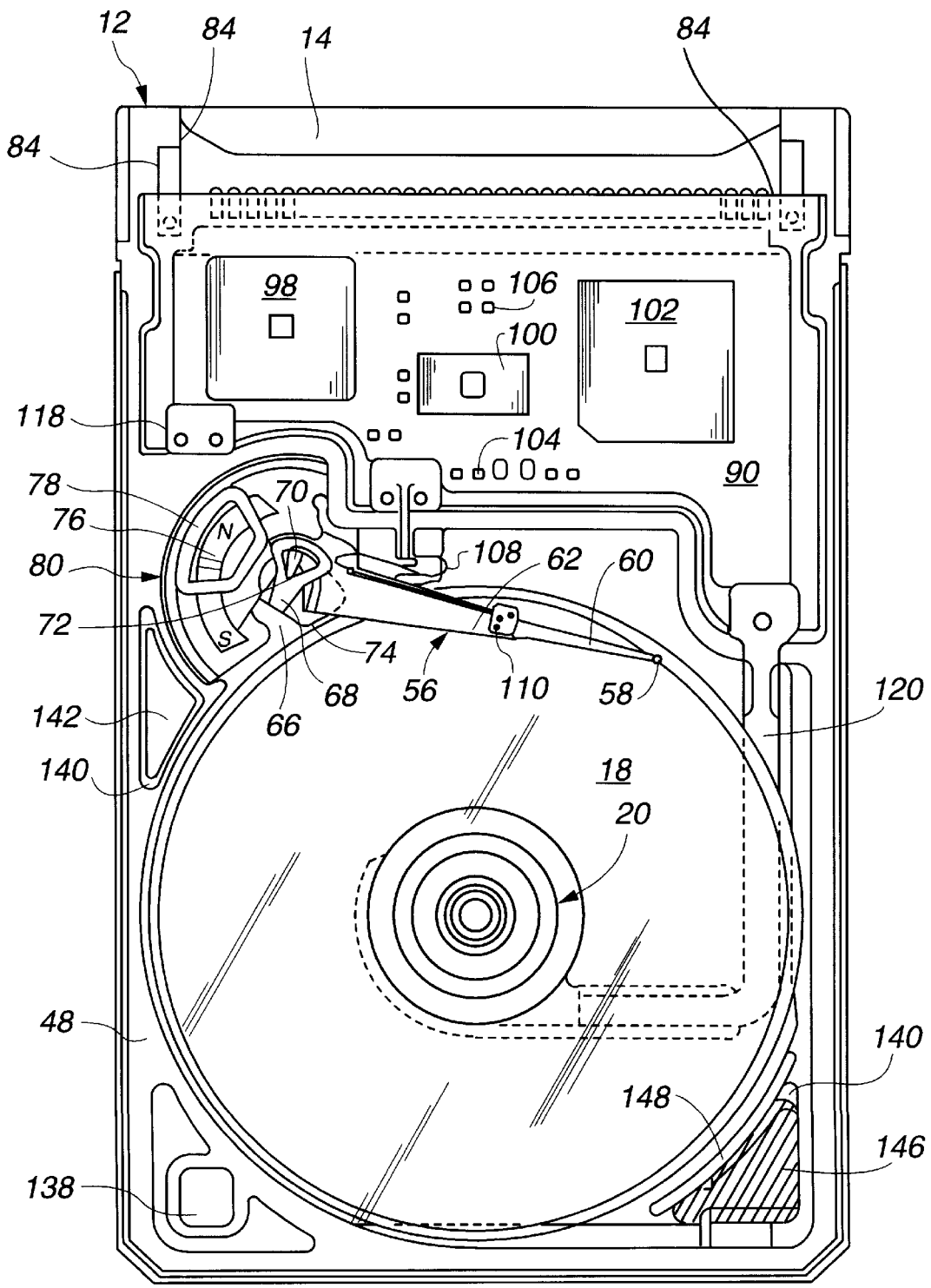
FIG. 2 is a top view of the hard disk drive.

Referring to the drawings more particularly by reference numbers, FIG. 1 shows a hard disk drive 10 of the present invention. The disk drive 10 is constructed as a card which can be plugged into a host computer (not shown). Disk drive 10 includes a housing 12 and a connector 14. In the preferred embodiment, the housing has the dimensions of 85.6×54.0× 5.0 millimeters. The dimensions conform with the specifications issued by the Personal Computer Memory Card International Association (PCMCIA) for a type II electronic card. The PCMCIA is an association that has promulgated a specification which list dimensions and other requirements for a standard electronic card. Each computer that conforms with the PCMCIA specification will contain slots that can receive a standardized card. With such a standard, electronic cards of one computer can be readily plugged into another computer, regardless of the model or make of the systems. A copy of the PCMCIA standard can be obtained by writing to the Personal Computer Memory Card International Association at 1030 G East Duane Avenue, Sunnyvale, Calif. 94086.

The PCMCIA standard includes three types of cards which each have varying thicknesses. A type I card is approximately 3.3 millimeters thick, a type II card is approximately 5.0 millimeters thick and a type III card is approximately 10.5 millimeters thick. The computer has a plurality of adjacent slots that are wide enough to receive a type II card. Both the type I and II cards occupy a single slot, while the type III card occupies two slots. Each computer slot contains a 68 pin connector that is typically mounted to a motherboard to provide an interconnect to the computer system. The PCMCIA standards were originally established for memory and/or logic cards including internal modem and facsimile boards. The present invention provides a hard disk drive unit that can conform to the PCMCIA type II card format.

In the preferred embodiment, the connector 14 of the disk drive 10 has 68 pins which can mate with the 68 pin connector located in the computer. The connector 14 is typically constructed from a dielectric material that has a plurality of sockets 16 which mate with pins (not shown) located in the computer connector. The connector has certain pins designated for power, ground and data. As required by the PCMCIA specification, the sockets dedicated to ground are longer than the sockets dedicated to power, and the sockets dedicated to power are longer than the sockets dedicated to data. Such an arrangement allows the card to be plugged into an operating "live" system, without creating voltage spikes or power surges within the card.

Referring to FIGS. 2–7, the hard disk drive 10 contains a disk 18 that is rotated by a spin motor 20. The disk 18 is typically constructed from a metal, glass, ceramic or composite substrate that is covered with a magnetic coating as is known in the art. As shown in FIG. 6, the spin motor 20 includes a hub 22 coupled to a magnetic fixed spindle 24 by a pair of conical bearings 26. Within the hub 22 is a stator 28 and a number of windings 30 which cooperate with magnets 32 attached to the inner surface of the hub 22. Providing a current to the windings 30 creates a magnetic flux which passes through the magnets 32 and induces a rotation of the hub 22 and the disk 18. The hub 22 has a pair of tapered inner surfaces 34 which slide along corresponding tapered surfaces 36 of the conical bearings 26. Between the tapered surfaces 34 and 36 is a thin layer of fluid which allows relatively frictionless rotation between the two members 22 and 26. Between the conical bearings 26 is a space 38 which provides a reservoir for the bearing fluid. The bearing fluid is preferably a ferro-fluid lubricant which is maintained between the hub 22 and bearings 26 by the magnetic flux of the fixed spindle 24. The conical bearings 26 provide a low profile spin motor 20 which can withstand the magnitude of shock that could be applied to a hand held computer and/or disk drive.

The disk 18 is clamped against a hub shoulder 40 by a disk clamp 42. The disk clamp 42 is preferably constructed from a thermoplastic material that is ultrasonically melted onto the spin motor 20. The thermoplastic flows into a plurality of grooves located in the hub 22. The plastic in the grooves prevents movement of the disk 18 in the z axis. A portion of the clamp 42 also flows into a space between the inner diameter of the disk 18 and the hub 22 to prevent lateral movement of the disk 18.

The fixed spindle 24 is captured by a pair of caps 45 and 46. The bottom cap 45 is mounted to a base plate 48 by a layer of adhesive 50. In the preferred embodiment the adhesive is a material sold by Minnesota Manufacturing & Minning Co. ("3M") under the designation AF46. The adhesive 50 is also used to mount the lower conical bearing 26 to the cap 45. The upper cap 46 is mounted to the fixed spindle 24. In the preferred embodiment, the cap 46 and cover plate 52 are coupled together by an adhesive viscoelastic film material 54 mounted on the cover plate 52. The viscoelastic material 54 compensates for tolerances between the height of the spin motor 20 and the space between the base plate 48 and cover plate 52. The viscoelastic material 54 also dampens shock and vibrational loads applied to the spin motor 20.

As shown in FIG. 2, the disk 18 rotates relative to an actuator arm assembly 56 which has a pair of transducers commonly referred to as heads. The heads 58 contain a coil (not shown) which can magnetize and sense the magnetic field of each corresponding adjacent surface of the disk 18. Each head 58 is supported by a flexbeam 60 that is attached to an actuator arm 62. In the preferred embodiment, each flexbeam 60 is constructed from one or more conductive plates (not shown) that are separated by a relatively elastic dielectric material (not shown). The metal plates may provide a conductive path for the signals that are sent to the heads 58. The heads 58 each contain a slider (not shown) which cooperates with the air stream produced by the rotation of the disk 18 to create an air bearing between the surface of the disk and the head. The air bearing lifts the head 58 off of the surface of the disk 18. The flexbeams 60 are constructed to be flexible enough to allow the heads 58 to be separated from the disk surface by the air bearings and take up the disk 18 and spin motor 20 axial runout. The heads 58 can be constructed to provide either horizontal or vertical recording.

The flexbeams 60 are inserted into slots of the actuator arms 62 by an adhesive. In the preferred embodiment, the adhesive can be cured by a primer, heat, or a UV light source. The actuator arms 62 are preferably constructed from a silicon carbide which is both light and strong. The actuator arms 62 pivot about a bearing assembly 66. As shown in FIG. 4, the bearing assembly 66 includes a bearing block 68 which extends from the base plate 48. Referring to FIG. 2, the actuator arms 62 have a triangular shaped roller bearing 70 which extends into a V shaped slot 72 in the block 68. The roller bearing 70 is pressed into contact with the block 68 by a C shaped spring clip 74. The apex of the roller bearing 70 engages the apex of the slot 72 such that the bearing rolls relative to the block 68 when the actuator arms 62 are rotated about the bearing assembly 66. The roller bearing of the present invention provides a low profile bearing assembly that produces a relatively small amount of friction and which can withstand the typical shock loads applied to a hand held disk drive.

At the end of the actuator arms 62 is a magnet 76 located between a pair of stationary coils 78. The magnet 76 has north (N) and south (S) poles, so that when a current is sent through the coils 78 in one direction the north pole experiences a force perpendicular to the coils 78, and when current is provided in an opposite direction the south pole experiences a force in the same direction. The magnet 76 and coils 78, commonly referred to as a voice coil motor or VCM 80, rotate the actuator arms 62 and move the heads 58 relative to the disk 18. As shown in FIG. 4, the coils 78 are mounted to a C shaped shield plate 82 that is constructed from a ferrite material which provides a return path for the magnetic flux, and maintains the flux in the area of the voice coil motor 80.

As shown in FIGS. 2 and 5, the connector 14 is located at one end of the housing 12 and is captured by indent surfaces 84 in the base plate 48 and cover plate 52. The indent surfaces 84 prevent the connector 14 from moving in any direction relative to the housing 12. The connector sockets 16 each have tails 86 that are soldered to conductive surface pads 88 on a printed circuit board (PCB) 90. As shown in FIG. 5, the printed circuit board 90 is supported by the base plate 48 and contains all of the electrical components required to operate the disk drive 10.

As shown in FIG. 7, mounted to the printed circuit board 90 is a controller chip 92, a read/write channel chip 94 and a servo chip 96. Each chip is housed within an integrated circuit package that is soldered to the board 90 by conventional techniques well known in the art. As shown in FIG. 2, the opposite side of the circuit board 90 contains a data manager chip 98, a pre-amplifier chip 100 and a read only memory (ROM) chip 102. The board 90 also contains passive elements such as resistors 104 and capacitors 106 to complete the electrical system of the drive assembly. The board 90 is located between the disk 18 and the connector 14. As shown in FIG. 5, the printed circuit board 90 is located in a plane essentially parallel with the disk 18. Locating the board 90 essentially "in-plane" with the disk 18 reduces the overall thickness of the disk drive assembly.

As shown in FIG. 2, the printed circuit board 90 is coupled to the actuator arm assembly 56 by a flexible circuit board 108. The flexible circuit board 108 is typically constructed from polyimide sheets commonly sold under the trademark KAPTON, which encapsulate conductive traces that extend throughout the circuit. One end of the flexible circuit board 108 has contact pads 110 that are soldered or ultrasonically bonded to the flexbeam 60. As shown in FIG. 5, the opposite end of the flexible circuit board 108 has contact pads that are pressed into operative contact with corresponding pads on the printed circuit board 90 by clamp down strips 116 located on the cover plate 52. The clamp down strips 116 are adapted to apply a pressure to the contact pads of the flexible circuit 108 when the cover plate 52 is attached to the base plate 48. The clamp down strips 116 provide a means of coupling/decoupling the flexible circuit board 108 to the printed circuit board 90 without having to solder together the two members. As shown in FIG. 2, the disk drive 10 also contains flexible circuits 118 and 120 that couple the printed circuit board 90 to the coils 78 of the voice coil motor 80 and the windings 30 of the spin motor 20, respectively. The flexible circuit 118 and 120 have contact pads that are pressed into contact with corresponding pads on the circuit board 90 by clamp down strips 116.

Figure 3:
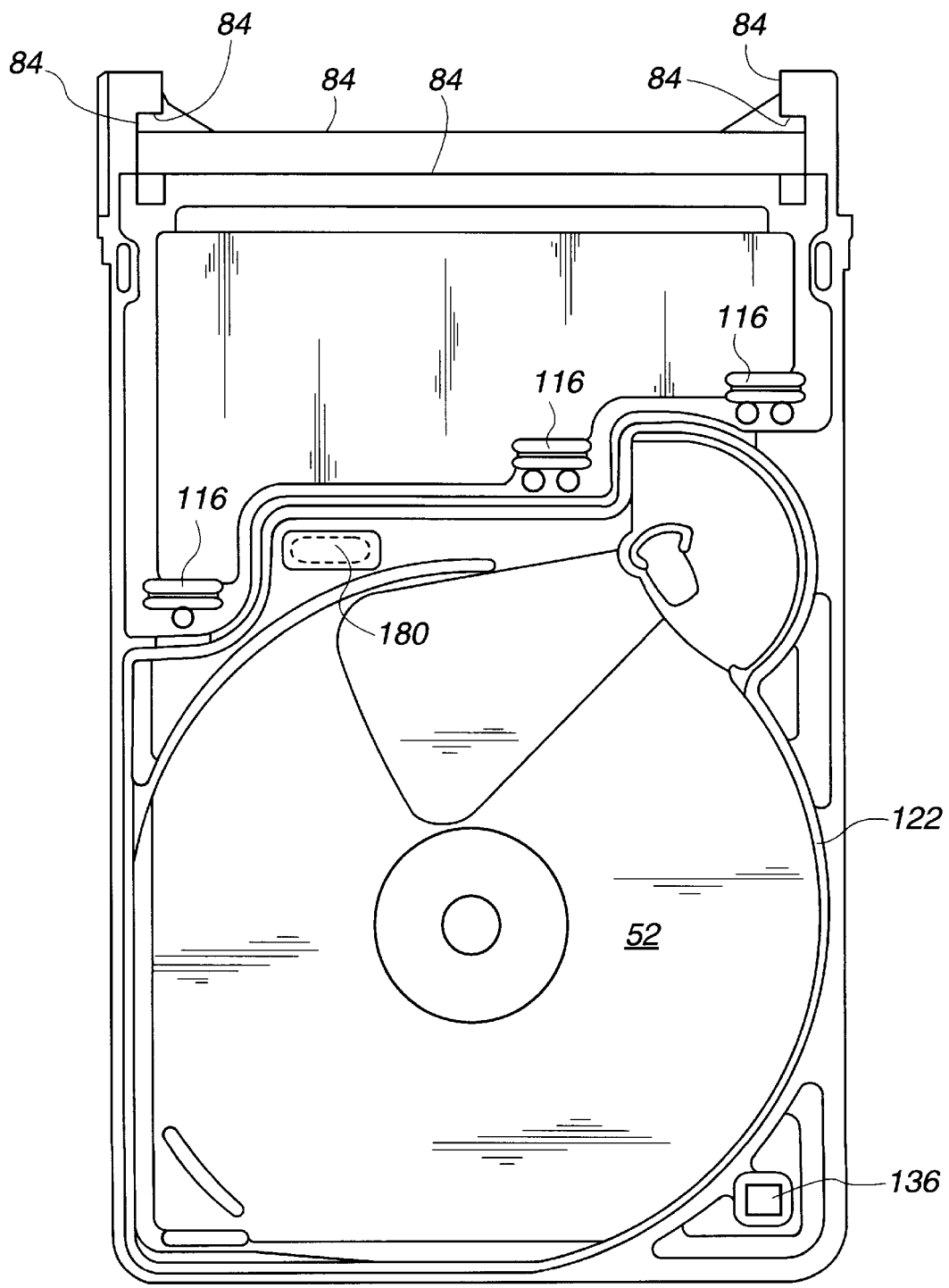
FIG. 3 is a bottom view of the cover of the hard disk drive.

As shown in FIGS. 3 and 4, mounted to the cover plate 52 is an elastomeric seal 122 that is pushed against a corresponding surface 124 in the base plate 48. The elastomeric seal 122 seals the disk 18, spin motor 20 and actuator arm assembly 56 in an area which is commonly referred to as the head disk assembly (HDA) 126. The cover plate 52 is attached to the base plate 48 by a clamp 128. The clamp 128 has a number of spring tabs 130 which extend into corresponding slots 132 in the plates 48 and 52. The clamp 128 may have an elastomeric strip 134 which absorbs external shock and vibrational loads that are applied to the edges of the disk drive 10. The disk drive 10 is typically loaded into a host computer so that the edges of the card are supported by the computer housing. Any shock or vibrational loads applied to the computer are therefore typically transmitted to the disk drive 10 through the edge of the drive. The elastomeric strip 134 dampens these loads to prevent damage or an interruption to the operation of the drive. The clamp 128 provides a means for attaching the base plate 48 to the cover plate 52 without using screws or other equivalent fastening means. The elimination of threaded fasteners assist in the reduction of the overall height of the assembly. As shown in FIGS. 2 and 3, the cover plate 52 has a rectangular pin 136 that is inserted into a corresponding groove 138 in the base plate 48 to align the two plates 48 and 52.

The base plate 48 has a filter chamber 140 which contains a breather filter 142 located external to the HDA 126. The base plate 48 has a slot which provides fluid communication between the HDA 126 and the chamber 140. When the pressure of the air within the HDA 126 is lower than the ambient air outside of the disk drive 10, the differential pressure will pump air past the clamp 128, through the interface of the cover plate 52 and base plate 48 and into the HDA 126 and base plate 48. The HDA 126 is in fluid communication with the filter chamber 140. The pumped air flows into the HDA 126 through the filter chamber 140. Hydrocarbon, acid-gas and other impurities in the air are captured by the breather filter 142. The breather filter 142 may also have a humidity control element.

The disk drive 10 also has a recirculation filter 146 that removes impurities within the HDA 126. The recirculation filter 146 is located in the center of a chamber which is separated from the HDA 126 by wall 148. The filter 146 separates an upstream chamber 150 from a downstream chamber. Rotation of the disk 18 induces a flow of air into the upstream chamber 150, through the filter 146, into the downstream chamber and back into the HDA 126 of the disk 18. As shown in FIG. 3, the disk drive 10 may also have an environmental control assembly 180 constructed from materials that absorb hydrocarbons, acid-gas and water.

Figure 8:
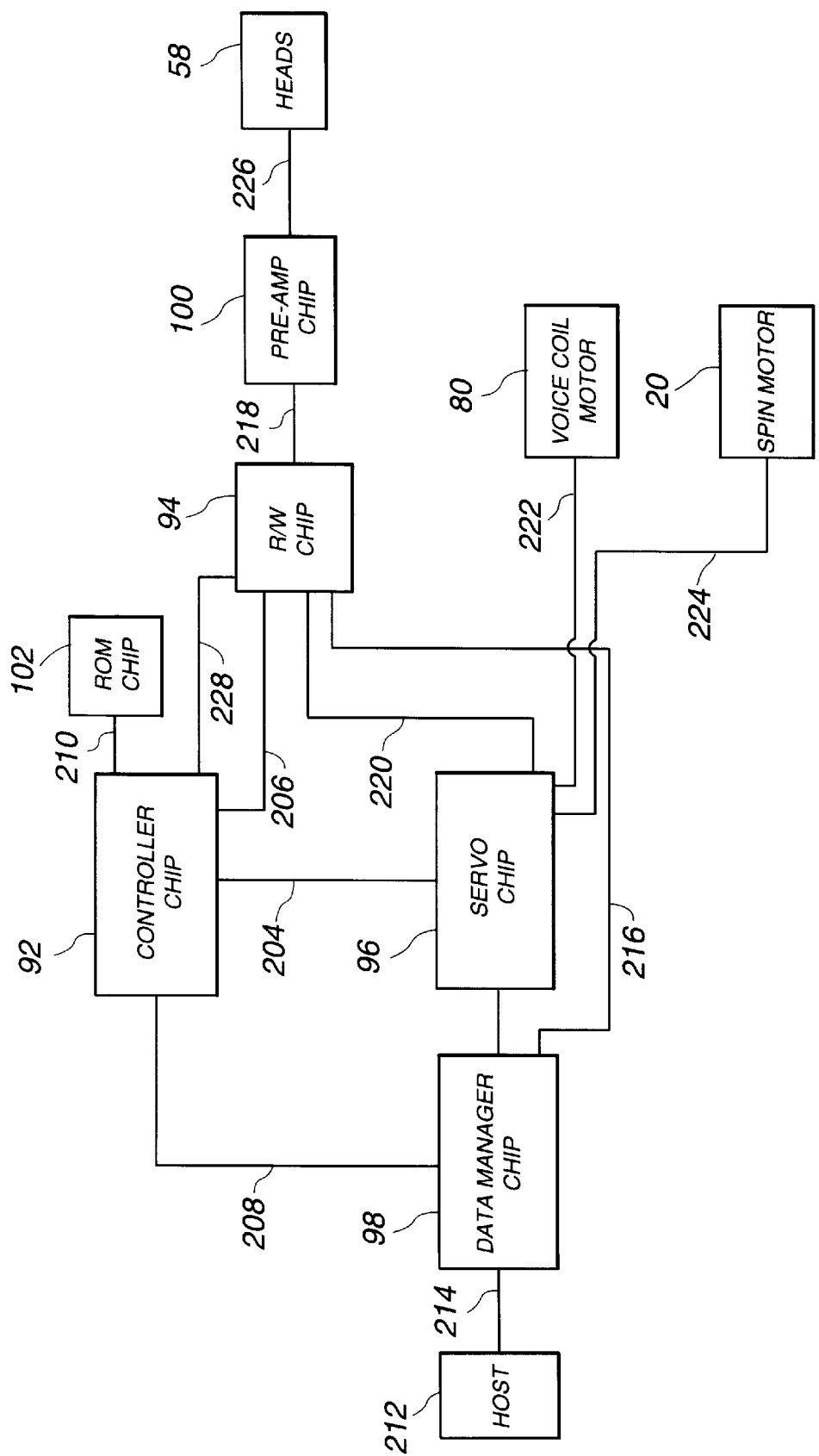
FIG. 8 is a schematic of the system architecture of the disk drive.

FIG. 8 shows a schematic of the system architecture of the hard disk drive 10. The system controls the operation of the disk drive. Data is typically stored on a magnetic disk 18 along annular tracks concentric with the diameter of the disk. In the preferred embodiment, the disk is 1.8 inches in diameter. Although a 1.8 inch disk is described, it is to be understood that the present invention can be used with disks having other diameters such as 1.3", 2.5", 3.5", etc. For a 1.8" disk, the system will typically store data on 130 tracks per disk surface. Each track contains a plurality of servo sectors. Each sector is capable of storing up to 768 bytes of data. The total assembly is capable of storing up to 130 Mbytes of data.

As shown in FIG. 8, the disk drive 10 includes the data manager chip 98, the controller chip 92, the servo chip 96 and the read/write ("R/W") chip 94. The disk drive also has the read only memory ("ROM") chip 102 coupled to the controller chip 92, and the pre-amplifier ("pre-amp") chip 100 connected to the heads 58 and the R/W chip 94. The controller chip 92 is coupled to the servo 96 and R/W 94 chips through serial lines 204 and 206, respectively. The controller chip 92 is coupled to the data manager chip 98 by address/data bus 208 and to the ROM chip 102 by instruction bus 210. The data manager chip 98 is coupled to a host 212 by address/data bus 214 and to the R/W chip 94 by data bus 216. The R/W chip 94 is connected to the pre-amplifier chip 100 by line 218. The servo chip 96 is coupled to the R/W chip 94 through servo line 220. The servo chip 96 is also connected to the voice coil motor 80 and spin motor 20 through lines 222 and 224, respectively. The pre-amp chip 100 is connected to the heads 58 through line 226. The controller chip 92 is also coupled to the R/W chip 94 by raw data line 228. The serial lines and address/data busses contain control signal lines which are needed to transfer information between the respective chips. Although the term "line" is used through this specification, it is to be understood that the term "line" may include multiple lines.

Figure 9:
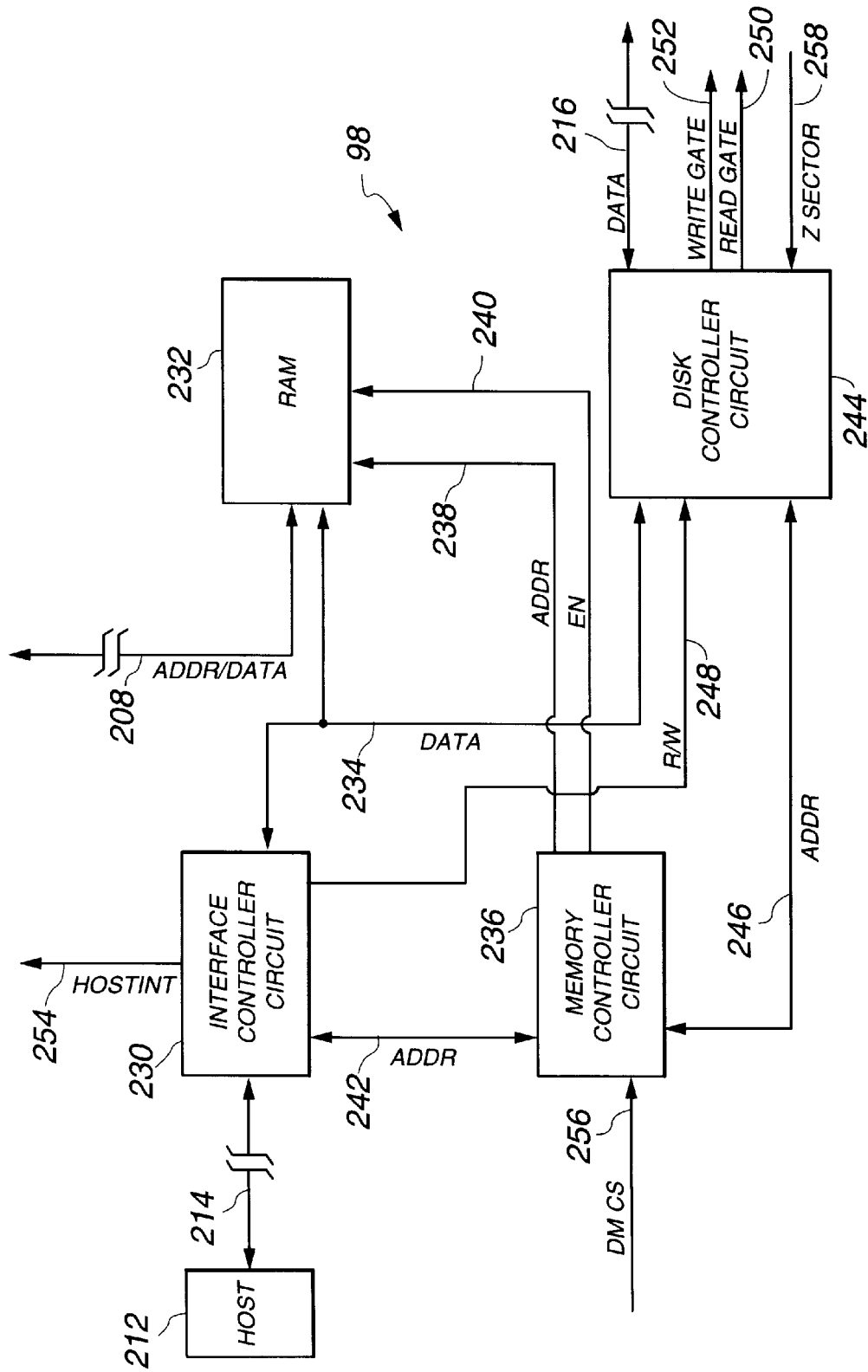
FIG. 9 is a schematic of the data manager chip of the system.

As shown in FIG. 9, the data manager chip 98 is coupled to the host 212 by an interface controller circuit 230. The interface controller circuit 230 contains hardware to interface with the host 212 by providing return handshakes, etc. in accordance with the host protocol. In the preferred embodiment, the interface controller circuit 230 complies with the PCMCIA protocol. The interface controller circuit 230 is coupled to a random access memory (RAM) 232 through data bus 234. The RAM 232 provides a data buffer to store the data transferred between the host 212 and the disk 18. In the preferred embodiment, the RAM can store up to 4.0 Kbytes of data. 3.5 Kbytes of memory is typically dedicated to storing data transferred between the host and the disk. The remaining 0.5 Kbytes of memory provide a scratch pad which is typically dedicated to storing certain predetermined disk drive characteristics. When each disk drive is assembled, various characteristics of the disk drive are determined and stored on the disk. When the disk drive is powered up, the controller chip 92 performs an initialization routine. Part of the routine retrieves the drive characteristics from the disk and stores the same in the scratch pad portion of the RAM 232.

The management of the RAM 232 is controlled by a memory controller circuit 236 which provides addresses to the RAM 232 on address bus 238 and an enable control signal on line 240. The memory controller circuit 236 receives access requests from the interface controller circuit 230 through line 242. The memory controller circuit 236 also receives access requests from a disk controller circuit 244 through line 246. The disk controller circuit 244 provides an interface between the data manager chip 98 and the R/W chip 94. The disk controller circuit 244 receives read/write control signals on line 248 from the interface controller circuit 230 which are relayed to the R/W chip 94 on read and write gate lines 250 and 252, respectively. The interface, memory and disk controller circuits are also connected to the controller chip 92 through lines 254, 256 and 258, respectively.

The memory controller circuit 236 controls the storage and retrieval of data between the RAM 232 and interface controller circuit 230, between the RAM 232 and the disk controller circuit 244 and between the controller chip 92 and the data manager chip 98. The RAM 232 and controller chip 92 are coupled together by the address/data bus 208. The controller chip 92 provides addresses at bus 208 and a data manager chip select (DM CS) control signal at line 256 when the controller chip 92 wants access to the RAM 232.

To write data onto the disk 18, the host 212 initially provides a write request that is received by the interface controller circuit 230, which executes the requisite handshaking sequence. The interface controller circuit 230 generates an access request to the memory controller circuit 236 to store the logical addresses and data from the host 212 to the RAM 232. The memory controller circuit 236 then stores the data in the RAM 232 in accordance with a memory mapping scheme. The interface controller circuit 230 generates a HOSTINT interrupt signal at line 254 that is sent to the controller chip 92.

After acknowledging the HOSTINT signal, the controller chip 92 will request access to the RAM 232 to read the logical addresses provided by the host 212. The controller chip 92 converts the logical addresses to physical disk addresses. The controller chip 92 may then initiate a seek routine to move the heads 58 to the proper location on the disk 18. When the voice coil motor 80 has moved the heads 58 to the desired disk sector, the controller chip 92 provides a Z sector signal at line 258 to the disk controller circuit 244. Upon receiving the Z sector signal, the disk controller circuit 244 provides a data access request to the memory controller circuit 236. The memory controller circuit 236 initiates a write sequence onto the disk 18 by placing the corresponding contents of the RAM 232 onto the data bus 216.

To read data from the disk 18, the host 212 provides a read request that is received by the interface controller circuit 230. The requested logical addresses are stored in the RAM 232. A HOSTINT signal is generated and the logical addresses are retrieved by the controller chip 92. The controller chip 92 converts the logical addresses to the actual sectors on the disk 18 and then initiates a seek routine to move the actuator arm 62, accordingly. When the heads 58 are above the proper disk location, the controller chip 92 provides a Z sector signal to the disk controller circuit 244. The disk controller circuit 244 then generates a memory access request to the memory controller circuit 236 which enables the RAM 232. Data is then transferred from the R/W chip 94 to the RAM 232 through the disk controller circuit 244. The memory controller circuit 236 then transfers the data from the RAM 232 to the host 212 through the interface controller circuit 230.

Figure 10:
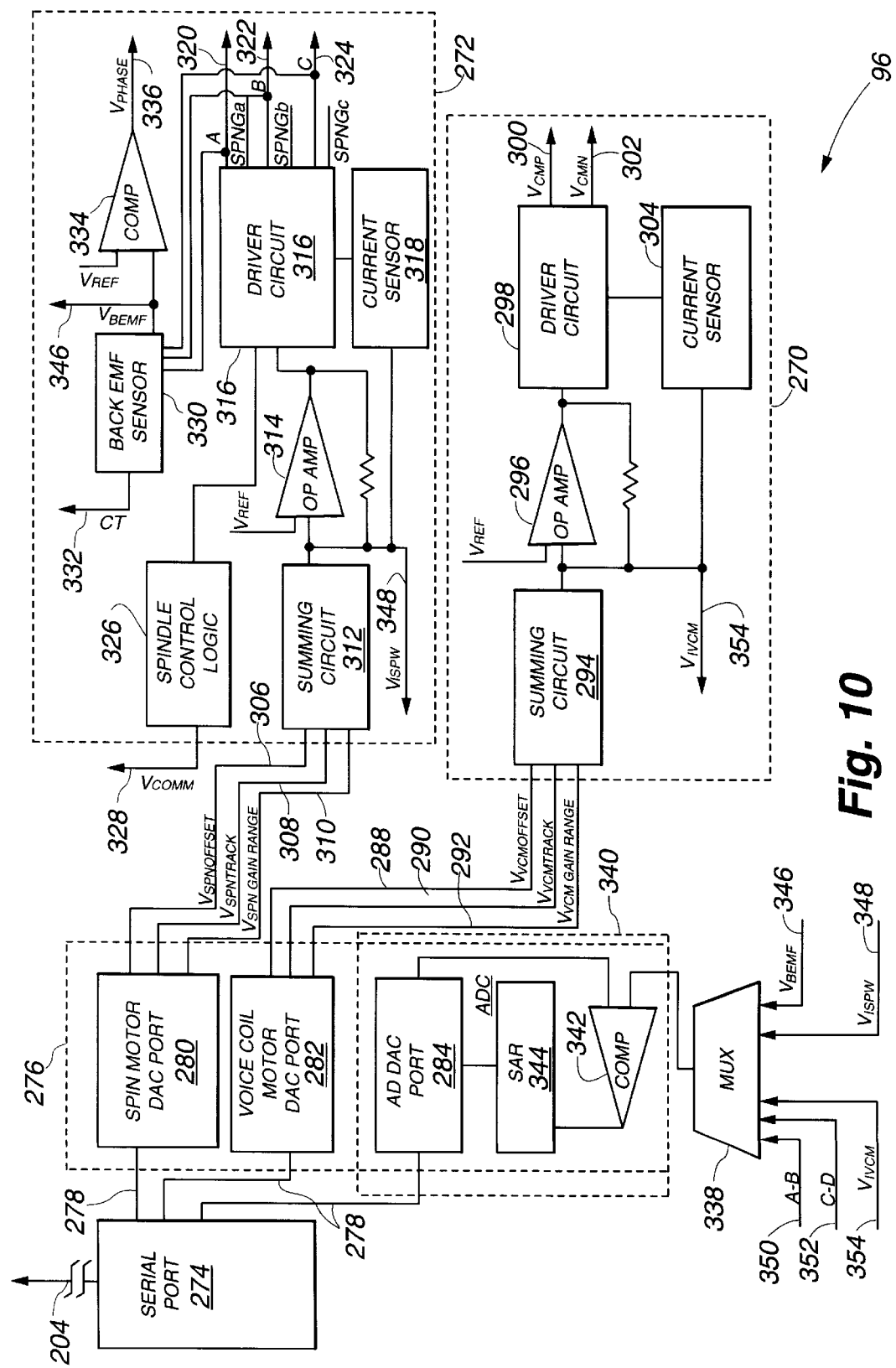
FIG. 10 is a schematic of the servo chip of the system.

As shown in FIG. 10, the servo chip 96 contains a voice coil motor control circuit 270 and a spin motor control circuit 272 to drive the voice coil motor 80 and spin motor 20, respectively. The servo chip 96 is coupled to the controller chip 92 by a bi-directional 16 bit synchronous serial port 274. The serial port 274 is coupled to a digital to analog converter (DAC) 276 by lines 278. The DAC 276 contains a spin motor DAC port 280, a voice coil motor DAC port 282 and an analog to digital (AD) DAC port 284.

The voice coil motor DAC port 282 provides three signals Vvcmoffset, Vvcmtrack and Vvcm gain range to the voice coil motor control circuit 270 on lines 288–292, respectively. The three signals are summed within a summing circuit 294. The Vvcmoffset signal provides the bias voltage for the voice coil motor 80. The Vvcmtrack signal provides a secondary voltage signal that will vary the bias signal to more accurately control the driving signal of the voice coil motor 80. The Vvcm gain range signal is another secondary signal that provides a higher resolution of the bias signal and is typically employed during a servo routine of the drive. The amplitudes of the three Vvcm signals are determined by a 8 bit data stream which is provided by the controller chip 92 to the voice coil motor DAC port 282 through the bi-directional serial port 274. The data command is accompanied by a 7 bit address and a read/write bit which are decoded by the serial port 274. The data is directed to the appropriate DAC port in accordance with the contents of the 7 bit address.

The summing circuit 294 provides a signal to an operational amplifier 296 which biases a driver circuit 298. The driver circuit 298 is connected to the coils 78 of the voice coil motor 80 through pins VcmP 300 and VcmN 302. The voice coil motor control circuit 270 also contains a current sensor 304 which is fed back to the operational amplifier 296 to provide a direct current control of the current supplied to the voice coil motor 80.

The spin motor DAC port 280 provides signals Vspnoffset, Vspntrack and Vspn gain range to the spin motor control circuit 272 through lines 306–310, respectively. The signals are received by the spin motor control circuit 272 which contains essentially the same components, summing circuit 312, op-amp 314, driver circuit 316 and current sensor 318, as the voice coil motor control circuit 270. The summing circuit 312 sums the three Vspn signals as described above. Like the voice coil motor signals, the offset signal provides a bias voltage and the other signals provide an adjustment of the bias voltage. The driver circuit 316 is connected to the windings 30 of the spin motor 20 through pins A, B and C on lines 320–324, respectively. The driver circuit 316 is controlled by spindle control logic 326 which sequentially enables the proper combination of drivers of the output lines A, B and C after receiving a commutation advance signal provided by the controller chip 92 on the Vcomm line 328. Each time a commutation advance signal Vcomm is provided, the spindle control logic 326 sequentially enables the correct drivers, so that a current is provided to the spin motor 20 in the proper combination of lines A, B or C.

The spin motor control circuit 272 has a back emf sensor 330 connected to the lines A, B and C on lines 320, 322 and 324, respectively, and to the center tap (CT) of the spin motor 20 on line 332. The sensor 330 provides a back emf signal to a comparator 334 which compares the signal to a reference voltage. The comparator 334 provides a Vphase signal to the controller chip 92 on line 336. The controller chip 92 utilizes the Vphase signal to commutate the spin motor 20 through the Vcomm line 328. In the preferred embodiment, the driver circuit 316 has additional lines SpnGa, SpnGb and SpnGc which can be connected to additional drivers to increase the current level provided to the spin motor 20. This feature allows the servo chip 96 to be used in disk drives which contain additional disks that require higher rotating torque.

The servo chip 96 has an analog multiplexer 338 which receives various input signals. The signals are multiplexed to an analog to digital converter (ADC) 340 which utilizes the digital to analog circuits of the DAC 276. The ADC 340 includes a comparator 342, and a serial approximation register (SAR) 344 which generates a series of 8-bit data strings.

In operation, the multiplexer 338 provides an analog signal to the comparator 342. The SAR 344 generates successive 8 bit words that are sent to the AD DAC port 284 which converts the word to an analog comparator signal. The analog comparator signal is compared with the analog signal from the multiplexer 338. The first word has the most significant bit set to 1 and all other bits set to 0. If the most significant bit is greater than the analog signal, then a bit 1 is provided to the serial port 274. The SAR 344 generates the next 8 bit word which is again converted to an analog signal and compared by the comparator 342. The new word has the next least significant bit set to 1. This routine is continued until 8 bits are provided to the serial port 274 to define the amplitude of the analog signal. The serial port 274 then sends the bits to the controller chip 92 through the serial line 204.

The multiplexer 338 receives input signals Vbemf and Vispn from the back emf sensor 330 and current sensor 318 on lines 346 and 348, respectively. A-B and C-D servo signals from the R/W chip 94 are provided to the multiplexer 338 through lines 350 and 352, respectively. The output signal Vivcm of the current sensor 304 is provided to the multiplexer 338 on line 354. These feedback signals are transmitted to the controller chip 92 through the ADC 340 and the serial port 274.

The voice coil motor control circuit 270 positions the heads 58 relative to the disk 18 in response to commands from the controller chip 92. The controller chip 92 and voice coil motor control circuit 270 move the actuator pursuant to either a seek routine or a servo routine. In a seek routine the heads 58 are moved from a first track location on the disk 18 to a second track location on the disk 18. The servo routine is used to maintain the heads 58 on the centerlines of the tracks.

Figure 11:
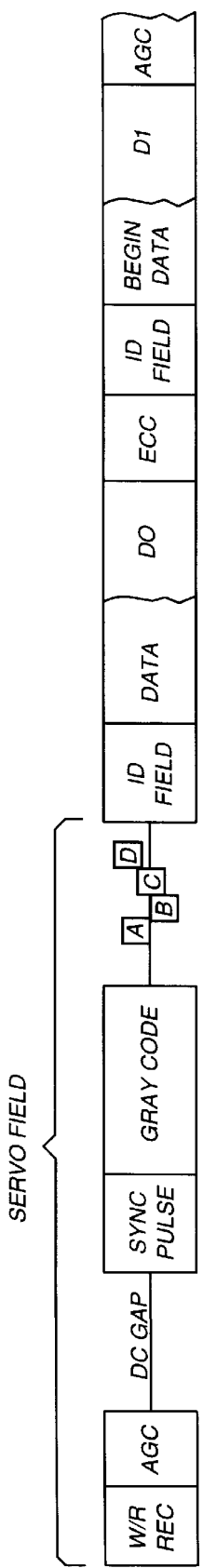
FIG. 11 is a representation of a sector of the disk.

In the preferred embodiment, the disk 18 contains embedded servo information. FIG. 11 shows a typical sector on a track of disk 18. Each sector initially contains a servo field followed by an ID field. The ID field includes a header address that identifies the sector. The ID field is followed by a data field D0 and error correction code (ECC) information. The ECC field is followed by another ID field which identifies a subsequent data field D1 that contains a fraction of the data of data field D0.

The servo field initially contains a write to read field and than an automatic gain control (AGC) field that is followed by a period of no data (DC gap). At the end of the DC gap is a sync pulse. The servo field also includes gray code to identify the particular cylinder (tracks) of the sector and a number of servo bursts A, B, C and D. Servo bursts A and B have an outer edge at the centerline of the track. Servo burst C is centrally located on the centerline of the track for even numbered tracks. Servo burst D has a bottom edge located at the top edge of servo burst C. The position of the head 58 relative to the centerline of the track can be determined by reading the amplitudes of servo bursts A–D. The AGC field is used to set the reference voltage value of the servo bursts.

The sync pulse is identified as the first voltage transition that is sensed after a predetermined number of clock cycles having no transitions after the AGC field. For example, after the head 58 senses the AGC field, three clock cycles may occur without any voltage transitions, before detection of the sync pulse. As an alternate scheme, the beginning of the gray code may provide a voltage transition which signifies the sync pulse.

Figure 12:
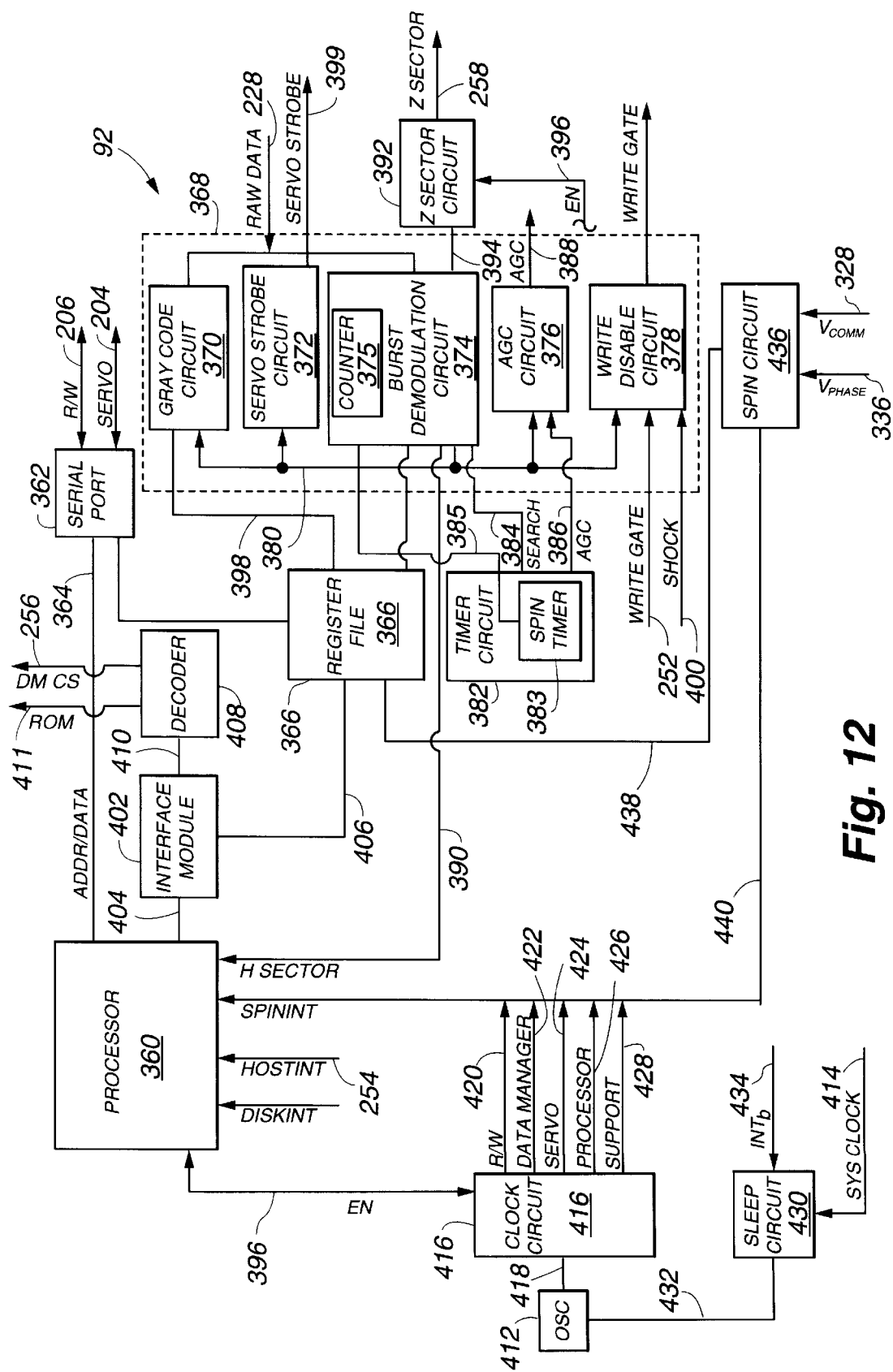
FIG. 12 is a schematic of the controller chip of the system.

FIG. 12 shows a schematic of the controller chip 92 which contains a core digital signal processor (DSP) which is a microprocessor illustrated as processor 360. In the preferred embodiment, processor 360 is a modified version of a processor sold by Texas instruments Inc. ("TI") under the part designation DSP TMS320C25. The processor 360 operates with less instruction sets than a conventional hard disk drive controller such as the controller chip sold by Intel Corp. under the family designation 80C196. The decrease in instruction sets results in less memory access requests. The processor 360 includes RAM memory (not shown). Conventional RAM devices operate with a 5.0 V nominal power supply. It is desirable to provide a hard disk drive that will run on 3.3 V nominal, a voltage level that is commonly used in portable laptop computers. Conventional RAM devices respond to processor memory access requests at a slower speed when operating at 3.3 V, than when the RAM device is operating at 5.0 V. The slower RAM speed degrades the performance of the processor. Utilizing a processor which requires fewer memory access requests for a given function provides a system that can operate on 3.3 V without appreciably affecting the performance of the processor.

The processor 360 has two separate internal busses (not shown) for transferring instructions and data. The dual bus architecture allows the processor 360 to execute fetching, decoding, reading and execution routines in parallel. The pipeline feature of the processor 360 significantly increases the performance of the processor 360. The processor 360 has on board memory that functions as both registers and a RAM device.

The controller chip 92 also has supporting "on-chip" hardware coupled to the processor 360. The supporting hardware includes a bi-directional 16 bit synchronous serial port 362 that is coupled to the servo 96 and R/W 94 chips through the serial lines 204 and 206, respectively. The serial port 362 is also connected to the processor 360 through address/data bus 364. The serial port 362 contains registers that provide a buffer between the processor 360 and the chips 94 and 96. The port 362 also generates chip select signals for the R/W chip 94 and the servo chip 96 in response to addresses provided by the processor 360. The serial port 362 is connected to a register file 366.

The controller chip 92 has a state machine 368 which contains a gray code circuit 370, servo strobe circuit 372, burst demodulation circuit 374, automatic gain control (AGC) circuit 376 and a write disable circuit 378. The burst demodulation circuit 374 controls the operation of the other circuits through lines 380. The burst demodulation circuit 374 is connected to a timer circuit 382 through line 384. Both the gray code circuit 370 and the burst demodulation circuit 374 are connected to a raw data line 228 to receive raw data from the R/W chip 94.

The timer circuit 382 has a number of timers, one of which "times out" prior to the servo burst of a sector. When the pre-servo timer times out, the timer circuit 382 provides an AGC signal to the AGC circuit 376 on line 386. The AGC signal enables the AGC circuit 376, which enables the automatic gain control circuitry of the R/W chip 94 through line 388. The timer circuit 382 also provides a search signal to the burst demodulation circuit 374 on line 384. The search signal enables the burst demodulation circuit 374 to begin searching for the sync pulse within the servo burst of the sector. Upon receipt of the search signal, the burst demodulation circuit 374 enables an internal sync mark field when no signal transitions (from the raw data line 228) occur within a predetermined number of clock cycles. If a transition occurs within a predetermined time after the field is enabled, the burst demodulation circuit 374 generates a H sector signal which signifies the detection of a sync pulse.

The H sector signal is provided to a Z sector circuit 392 on line 394 and to the processor 360 on line 390. The H sector signal from the burst demodulation circuit 374 sets a pair of timers within the Z sector circuit 392. The Z sector circuit 392 provides a Z sector signal to the data manager 98 and R/W 94 chips on line 258 when a timer "times out". There is preferably a timer for each data field D0 and D1. The Z sector circuit 392 only generates a Z sector signal if the circuit 392 has been enabled by the processor 360 through enable line 396.

The burst demodulation circuit 374 enables the gray code circuit 370 after detection of the sync pulse. The gray code circuit 370 contains shift registers which store the gray code provided on the raw data line 228. The gray code is then stored in a dedicated address in the register file 366 through bus 398, for subsequent retrieval by the processor 360. The detection of the sync pulse also sets an internal timer in the burst demodulation circuit 374. When the timer times out the burst demodulation circuit 374 disables the gray code circuit 370 and enables the servo strobe circuit 372. The servo strobe circuit 372 sends out a series of two bit signals on line 399, to enable internal circuits within the R/W chip 94 to provide the A-B and C-D signals to the servo chip 96. The A-B and C-D signals are then sent to the register file 366 through the ADC 340 and the serial ports 274 and 362.

When the timer circuit 382 generates the search signal, the burst demodulation circuit 374 also enables the write disable circuit 378. The write gate line 252 from the data manager chip 98 is routed to the pre-amp chip 100 through the write disable circuit 378, so that the write disable circuit 378 can disable the write signal and prevent writing of data onto the disk 18. The write disable circuit 378 disables the write signal during the servo burst to prevent any writing of data onto the servo field. The write disable circuit 378 is also enabled by a shock sensor (not shown) through line 400. The shock sensor provides an enabling signal when the disk drive 10 is accelerated beyond a predetermined value. The shock sensor and write disable circuit 378 prevent writing of data when the disk drive 10 is subjected to an excessive shock.

The controller chip 92 contains a interface module 402 that is coupled to the processor 360 and register file 366 through busses 404 and 406, respectively. The interface module 402 provides a memory map between the processor 360 and the register file 366. The interface module 402 allows the supporting on-chip hardware to be coupled to different types of processors. The interface module 402 is coupled to a decoder 408 through line 410. The decoder 408 decodes addresses provided by the processor 360 to enable chip select control signals ROM and DM CS that select either the ROM chip 102 or data manager chip 98 through lines 411 and 256, respectively.

The controller chip 92 contains an oscillator 412 which receives a clock signal from a system clock on line 414 via a sleep circuit 430. The oscillator 412 provides a clocking signal to clock circuit 416 on line 418. The clock circuit 416 provides clocking signals for the R/W chip 94, data manager chip 98, servo chip 96, processor 360 and the support hardware of the controller chip 92 on lines 420–428, respectively. In the preferred embodiment, the oscillator 412 generates a 30 MHz clock signal. The oscillator 412 is connected to the sleep circuit 430 through line 432. The sleep circuit 430 disables the oscillator 412 when an INTb signal is provided to the sleep circuit 430 on line 434. The INTb signal is typically provided by the host processor (not shown). The host processor typically provides the sleep signal when a disk access request has not been generated for a predetermined time interval, by setting a bit within a register of the register file 366.

The support hardware also contains a spin circuit 436 which is connected to the servo chip 96 through the Vphase and Vcomm lines 336 and 328. The spin circuit 436 is connected to both the register file 366 and the processor 360 by lines 438 and 440, respectively. When the spin circuit 436 receives a Vphase signal, the spin circuit 436 provides an interrupt signal to the processor 360 on the SPININT line 440. The Vphase signal also sets an internal Vcomm timer within the spin circuit 436. Additionally, the spin circuit 436 also reads a dedicated register(s) in the register file 366. The contents of the register file 366 provide a time interval between when the spin circuit 436 receives the Vphase signal and when the spin circuit 436 generates the Vcomm signal for the spin motor control circuit 272 of the servo chip 96.

The processor 360 has a continuously running internal timer (not shown). When the processor 360 acknowledges the SPININT pin 440 and the line is activated by the spin circuit 436, the processor 360 reads the time of the internal timer and the value of the Vcomm timer in the spin circuit 436. The Vcomm timer value signifies the amount of time elapsed between the reception of the Vphase signal and the acknowledgment by the processor 360 of the SPININT interrupt signal. The Vcomm time is subtracted from the time value of the internal processor timer. The resulting time is compared to a theoretical time to determine if there is an error in the speed of the spin motor 20. The spin motor 20 typically has 12 poles wherein there are created 36 Vphase signals per revolution.

In the alternative, the speed of the spin motor 20 can be measured by counting the number of pulses between the end of the AGC field and the beginning of the DC gap. In this embodiment, a time field of microseconds is created between the end of the AGC field and the beginning of the DC gap of each disk sector. This time field contains a predetermined number of pulses. After a sync pulse is detected, a spin timer 383 is set. The spin timer 383 times out at the end of the AGC field of the next sector. The spin timer 383 enables a counter 375 in the burst demodulation circuit 374 by activating pin 385. The counter 375 counts the number of pulses detected by the head 58. The number of pulses is then stored in the register file 366. After the processor 360 completes the voice coil motor 80 routine, the processor 360 retrieves the number of pulses counted by the counter 375 and compares the count to a nominal value. If the count is different than the nominal value, the processor 360 generates a digital command that is sent to the servo chip 96 to either speed up or slow down the spin motor 20. The processor 360 also changes the spin timer 383 so that the spin timer 383 will time out at exactly the end of the AGC field of the next sector. In this manner the processor 360 insures that the counter 375 always begins counting at the end of the AGC field, thereby insuring an accurate spin motor control error value.

The processor 360 acknowledges the interrupt signals H sector, SPININT, HOSTINT and DISKINT in accordance with a hierarchy that responds to the H sector interrupt signal first (voice coil motor subtask), SPININT interrupt signal second (spin motor subtask) and then either the HOSTINT or DISKINT interrupt signals (data subtask). Accordingly, when the burst demodulation circuit 374 detects a sync pulse signal, a pulse is sent to the processor 360 on the H sector line 390. Upon receiving the H sector signal the processor 360 may initiate a servo routine. The processor 360 initially reads the registers within the register file 366 that contain the gray code information. The processor 360 determines the cylinder location of the head 58 and then writes data containing voice coil motor control information to the serial port 362. The serial port 362 then sends the data to the servo chip 96. If the gray code corresponds to a desired track location (e.g., for a read or write of data from the disk) the processor 360 enables the Z sector circuit 392 through the enable line 396.

After the gray code is read, the processor 360 reads the A-B and C-D servo information. The servo burst information is processed by the processor 360 to determine the location of the head 58 relative to the centerline of the track. The processor 360 then writes data to the serial port 362 for subsequent transmittal to the servo chip 96. If the processor 360 is in a seek routine the servo information is not fetched from the register file 366.

After the servo routine, the processor 360 acknowledges any SPININT signal from the spin circuit 436 and computes the difference between the actual motor speed and the theoretical motor speed. In the preferred embodiment, the processor 360 stores the error values of each sector and computes a mean spin motor error each revolution of the disk. The processor 360 then writes control data to the servo chip 96 through the serial port 362 to control the speed of the spin motor 20, typically during an index sector that occurs once per revolution of the disk 18.

After the spin routine the processor 360 acknowledges any HOSTINT or DISKINT interrupt signals. If the HOSTINT pin is active the processor 360 retrieves the logical addresses stored in the RAM 232 of the data manager chip 98. The processor 360 converts the logical addresses to actual sector locations on the disk. The processor 360 initiates a seek routine if the head 58 is not above the desired track. Once the head 58 reaches a desired sector of the disk 18, the controller chip 92 provides the Z sector signal to the data manager chip 98 which then transfers data with the R/W chip 94. A active DISKINT signal indicates the end of a data transfer or an error in the process of transferring data. The register file 366 typically has an error bit that is set when an error has occurred. The processor 360 reads the error bit and performs an error correction routine if there is an error.

Figure 13:
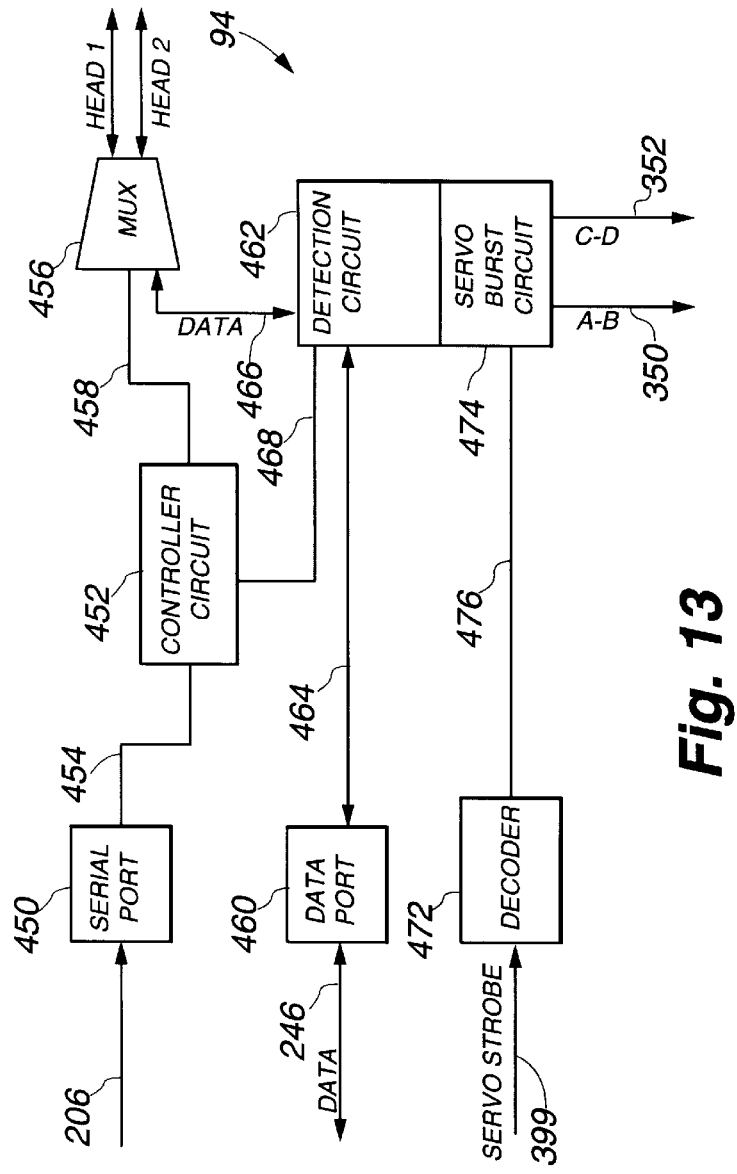
FIG. 13 is a schematic of the R/W chip of the system.

FIG. 13 shows a schematic of the R/W chip 94. The R/W chip 94 contains a bi-directional 16 bit synchronous serial port 450 that is coupled to the serial port 362 of the controller chip 92. The serial port 450 is coupled to a controller circuit 452 through line 454. The controller circuit 452 is connected to a multiplexer 456 through line 458. The multiplexer 456 multiplexes the various lines of the heads 58 in accordance with instructions received from the controller chip 92 through the serial port 450 and the controller circuit 452.

The R/W chip 94 has a data port 460 that is coupled to a detection circuit 462 through bus 464. The detection circuit 462 is coupled to the multiplexer 456 and controller circuit 452 by lines 466 and 468, respectively. The detection circuit 462 detects transitions in the voltage provided by the heads 58 and provides a digital output to the data port 460 through line 464. The R/W chip 94 has a decoder 472 connected to the servo strobe circuit 372 of the controller chip 92. The decoder 472 is coupled to a servo burst circuit 474 through line 476. The decoder 472 enables the servo burst circuit 474 in response to pulses received from the servo strobe circuit 372. The servo burst circuit 474 provides the servo signals A-B and C-D to the servo chip 96 on lines 350 and 352, respectively.

In the preferred embodiment, the R/W chip 94 is an integrated circuit similar to a product sold by Silicon Systems Inc. ("SSI") under the part designation 32PA4730. The pre-amplifier chip 100 is preferably a conventional integrated circuit sold by TI under the part designation TLV2234.

FIGS. 14a–g provide a flowchart of a typical operating sequence of the disk drive 10. In processing block 500 the host 212 provides the disk drive 10 with a request to write data to logical addresses A0–A63. The other condition is a head position at the end of a sector of the disk 18. In block 502 the data manager chip 98 stores the logical addresses and data from the host 212 into the RAM 232 and activates the HOSTINT interrupt signal. As the disk 18 spins the servo field of a sector approaches the head 58. In block 504, the search timer of the timer circuit 382 times out and provides the search signal and H sector signal to the burst demodulation circuit 374 and processor 360, respectively. The AGC circuit 376 is also enabled to provide a control signal to the R/W chip 94 to initiate automatic gain control in block 506.

Along a parallel path the spin motor control circuit 272 of the servo chip 96 generates a Vphase signal that is received by the spin circuit 436 of the controller chip 92 in block 508. The spin circuit 436 generates a SPININT interrupt signal for the processor 360 and initiates an internal timer in block 510. The spin circuit 436 also accesses the register file 366 to determine the time interval between the Vphase signal and the generation of the Vcomm signal in block 510. In block 512, the spin circuit 436 generates the Vcomm signal after the predetermined time interval.

Figure 14A:
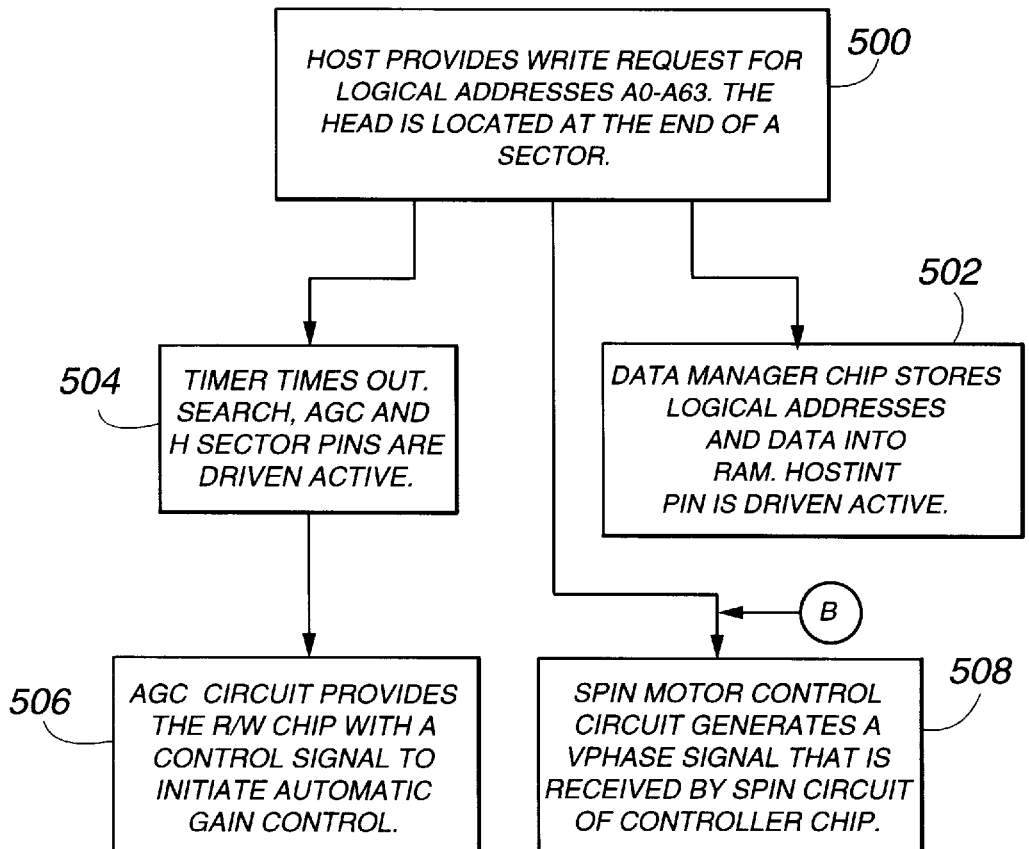
FIGS. 14a–g are flowcharts of the operation of the disk drive.
Figure 14B:
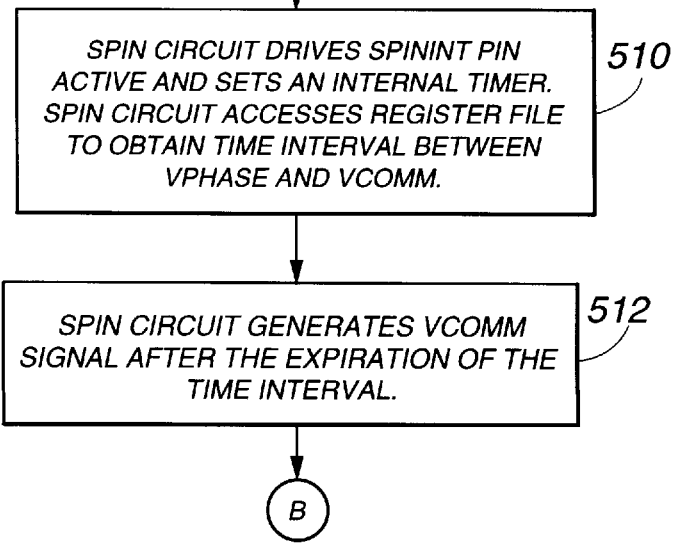
Figure 14C:
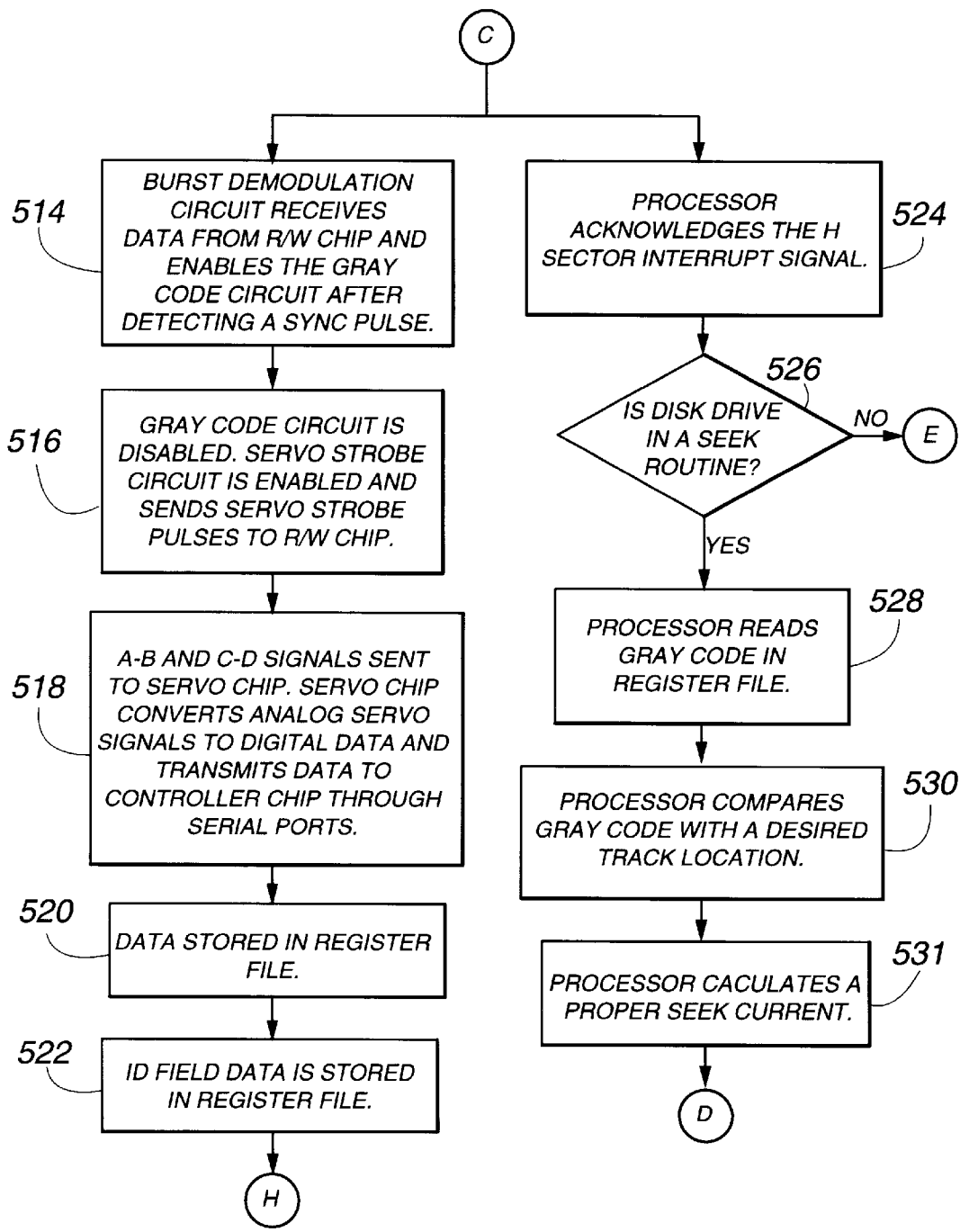

As shown in FIG. 14c, after block 506, the burst demodulation circuit 374 reads raw data from the R/W chip 94 and enables the gray code circuit 370 upon the detection of the sync pulse in block 514. In block 516, the burst demodulation circuit 374 disables the gray code circuit 370 and enables the servo strobe circuit 372, which provides servo strobe circuit 372, which provides servo strobe pulses to the R/W chip 94. The R/W chip 94 provides the servo signals A-B and C-D to the servo chip 96 in block 518. The servo chip 96 converts the analog servo signals to digital data strings, which are transmitted to the controller chip 92 and stored in the register file 366 in blocks 518 and 520. The ID field of the servo burst is subsequently stored in the register file 366 in block 522.

In processing block 524, the processor 360 acknowledges the H sector interrupt signal. In decision block 526, the processor 360 determines whether the disk drive 10 is in a seek routine. If the drive is in a seek routine, the processor 360 reads the contents of the register file 366 which contain the gray code information in processing block 528. In blocks 530–532 the processor 360 compares the gray code data with a desired track location, computes a seek current and generates a write command which is transmitted to the servo chip 96 through the serial ports 274 and 362. As shown in FIG. 14e, if the drive is in a servo routine the processor 360 reads the contents of the register file 366 which contain the servo burst information in processing block 534. The servo burst information is used to determine whether the head 58 is on the centerline of the track and to calculate a voice coil motor correction command in processing blocks 536 and 537. The processor 360 then generates a write command containing voice coil motor control data to the servo chip 96 through the serial ports in block 532. The digital voice coil motor control data is converted to an analog signal by the voice coil DAC port 282 of the servo chip 96 and provided to the voice coil motor 80 to move the actuator arm and heads 58 of the assembly.

Figure 14D:
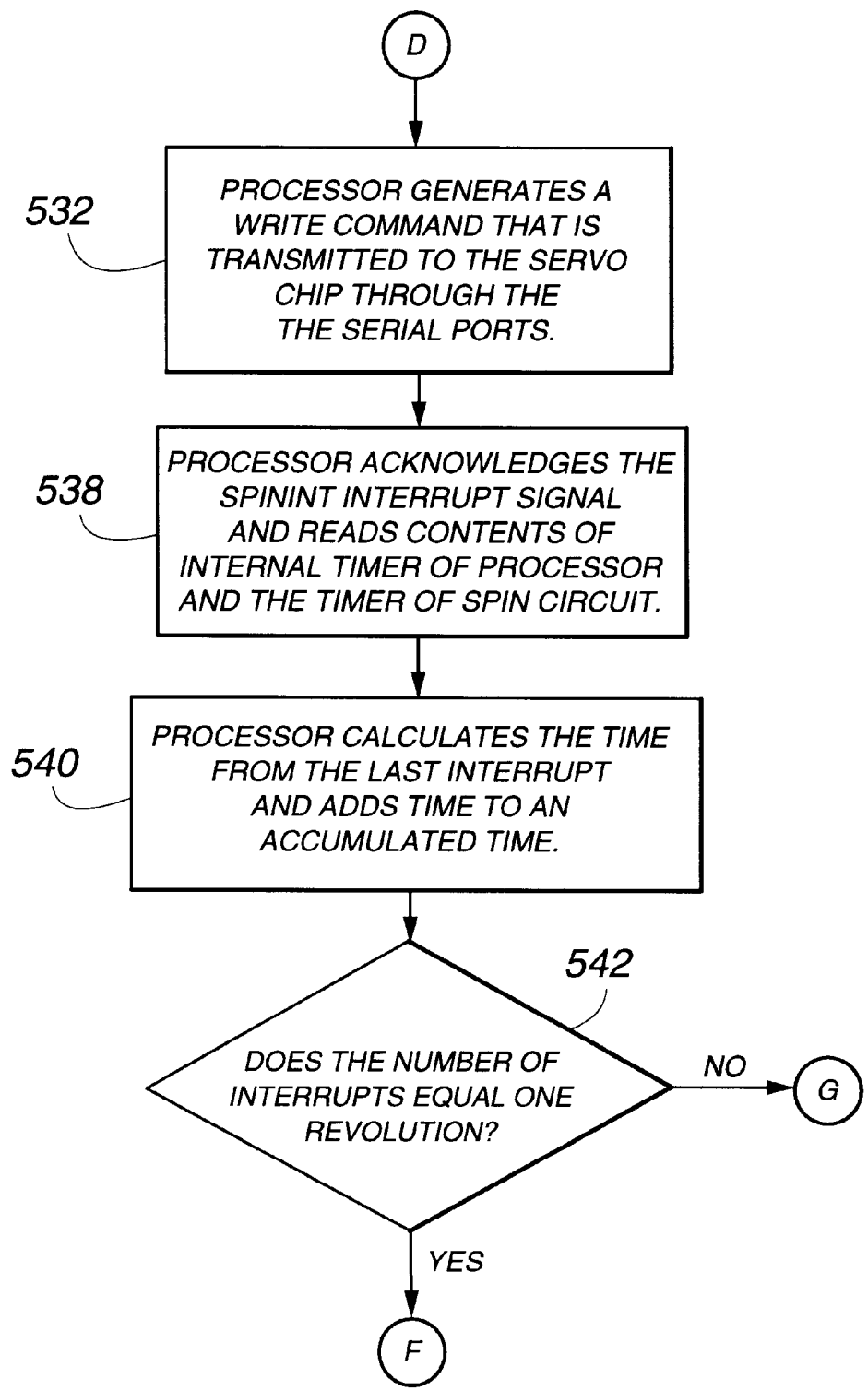
Figure 14E:
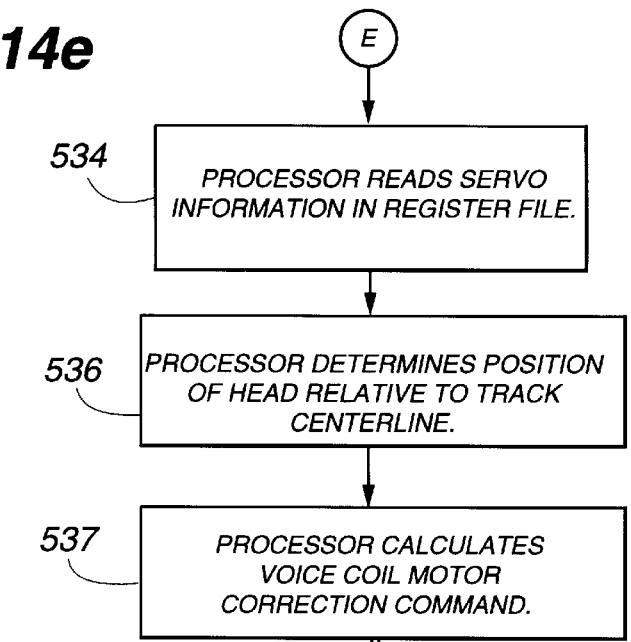
Figure 14G:
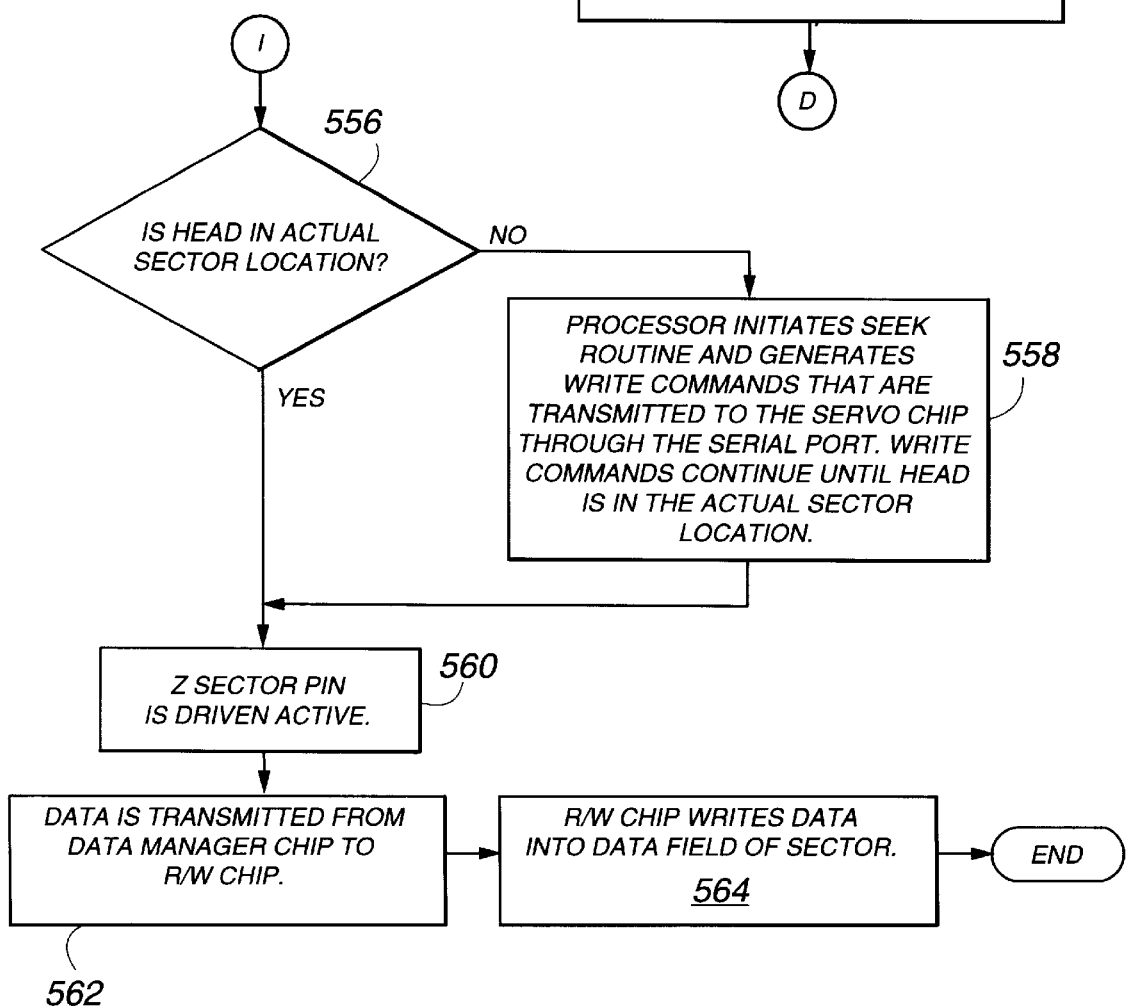
Figure 14F:
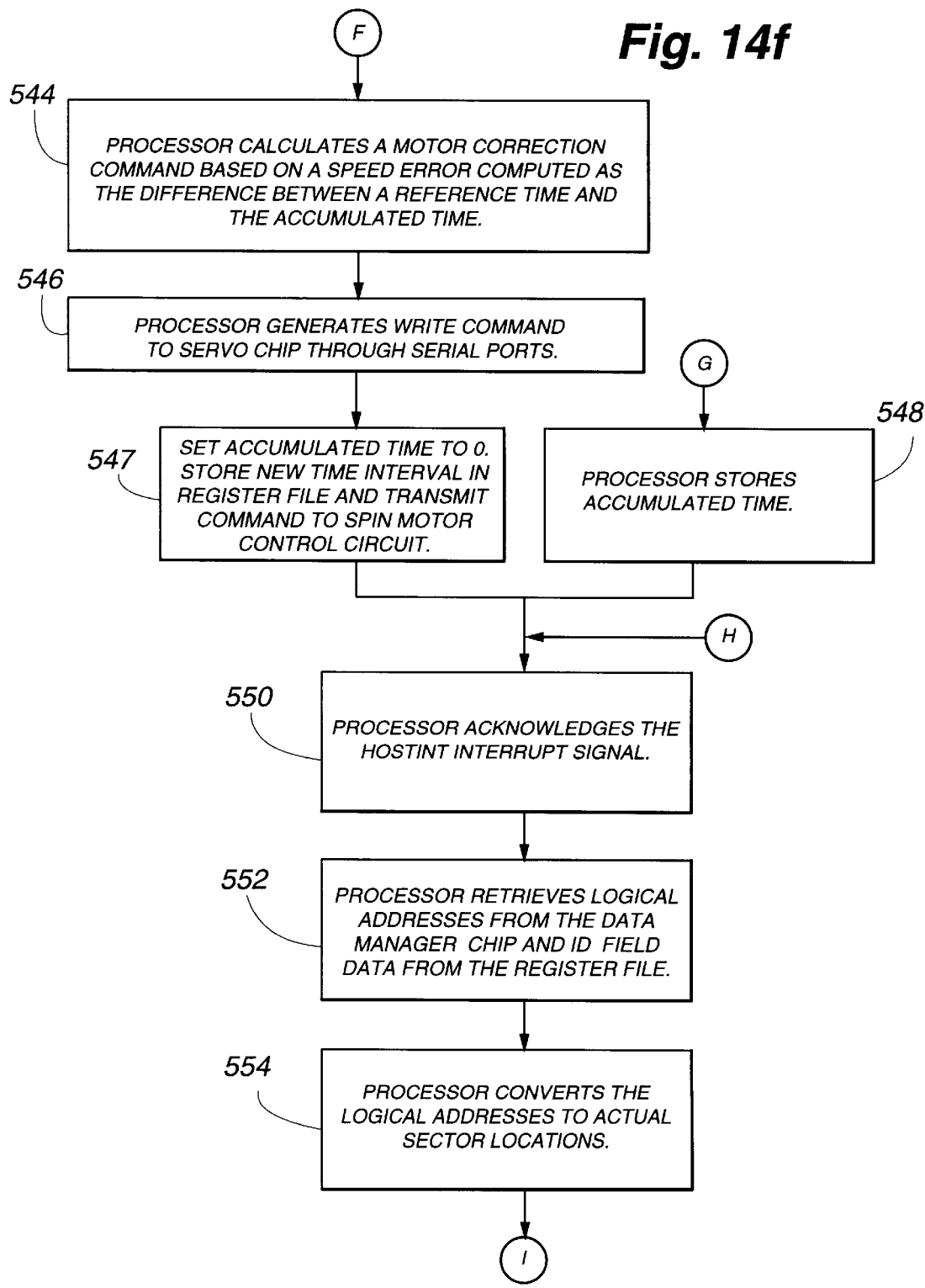

As shown in FIG. 14d, in block 538, the processor 360 acknowledges the SPININT interrupt signal, if one exists. The processor 360 reads the processor internal timer and the Vcomm timer of the spin circuit 436 in block 538. The processor 360 computes the time interval between the Vphase signals and adds the time interval to an accumulated time in block 540. In accordance with decision block 542, if the number of interrupts equals one revolution, the processor 360 calculates a motor correction command and generates a write command to the servo chip 96 through the serial ports in processing blocks 544 and 546. The spin correction command is calculated from the difference between a reference time and the accumulated time. The accumulated time is reset to zero in block 547. A new time interval value is also stored in the register file 366 for subsequent use by the spin circuit 436, and the write command is transmitted to the servo chip which converts the digital string into analog signals which are provided to the spin motor control circuit 272 in block 547. If the number of interrupts does not equal a revolution, the accumulated time is stored by the processor 360 in block 548.

In processing block 550, the processor 360 acknowledge the HOSTINT interrupt signal from the data manager chip 98. The processor 360 then retrieves the logical addresses from the RAM 232 within the data manager chip 98 and the ID field data in the register file 366 in processing block 552. In block 554, the processor 360 converts the logical addresses to actual sector locations. In accordance with decision block 556, if the head 58 is not above the actual sector location, the processor 360 initiates a seek routine and generates write commands to the servo chip 96 to move the voice coil motor 80 in processor block 558. The actuator arm is moved until the head 58 is in the proper track. The processor 360 continually reads gray code until the actual sector location is adjacent to the head 58. In block 560, the processor 360 enables the Z sector circuit 392 which activates the Z sector pin after the servo field of the sector. The activation of the Z sector pin initiates a write of data from the data manager chip 98 to the R/W chip 94 in processing block 562, and the R/W chip 94 writes the data into the data field of the sector in processing block 564.

While certain exemplary embodiments have been described and shown in the accompanying drawings, it is to be understood that such embodiments are merely illustrative of and not restrictive on the board invention, and that this invention not be limited to the specific constructions and arrangements shown and described, since various other modifications may occur to those ordinarily skilled in the art.

What is claimed is:

1. A disk drive, comprising:
a digital signal processor for controlling various operations of the disk drive, wherein the digital signal processor includes separate first and second internal busses, the first internal bus is for transferring instructions, the second internal bus is for transferring data, and the digital signal processor performs fetching, decoding, reading and execution routines in parallel while simultaneously receiving data.

2. The disk drive of claim 1, wherein the operations include read and write operations.

3. The disk drive of claim 1, wherein the operations include servo operations.

4. The disk drive of claim 1, wherein the operations include spin motor operations.

5. The disk drive of claim 1, wherein the operations include voice coil motor operations.

6. The disk drive of claim 1, wherein the operations include read, write, servo, spin motor and voice coil motor operations.

7. The disk drive of claim 1, wherein the first and second internal busses do not directly communicate with circuits external to the digital signal processor.

8. The disk drive of claim 1, wherein the digital signal processor is devoid of an analog to digital converter.

9. The disk drive of claim 1, wherein the digital signal processor is a reduced instruction set (RISC) microprocessor.

10. The disk drive of claim 1, wherein the disk drive is a portable memory card.

11. A disk drive, comprising:
a disk for storing data;
a head for writing data to and reading data from the disk;
a read/write circuit for transferring data to and from the head;
a data manager circuit for transferring data between the read/write circuit and an external device;
a spin motor for rotating the disk;
a voice coil motor for positioning the head relative to the disk;
a servo control circuit for controlling the spin motor and the voice coil motor; and
a controller for controlling the read/write circuit, the data manager circuit and the servo control circuit, wherein the controller includes a digital signal processor, the digital signal processor includes separate first and second internal busses, the first internal bus transfers instructions, the second internal bus transfers data, and the digital signal processor performs fetching, decoding, reading and execution routines in parallel while simultaneously receiving data and executing instructions.

12. The disk drive of claim 11, wherein the first and second internal busses do not directly communicate with circuits external to the digital signal processor.

13. The disk drive of claim 11, wherein the digital signal processor is devoid of an analog to digital converter.

14. The disk drive of claim 11, wherein the digital signal processor is a reduced instruction set (RISC) microprocessor.

15. The disk drive of claim 11, wherein the disk drive is a portable memory card.

16. A disk drive, comprising:

a disk for storing data;

a head for writing data to and reading data from the disk; and a controller for controlling various operations of the disk drive, wherein the controller includes a core pipelined digital signal processor, the digital signal processor includes separate first and second internal busses and random access memory, the first internal bus transfers instructions within the digital signal processor, the second internal bus transfers data within the digital signal processor, the first and second internal busses allow the digital signal processor to execute fetching, decoding, reading and execution routines in parallel, and the digital signal processor simultaneously receives data and executes instructions during operation of the disk drive.

17. The disk drive of claim 16, wherein the controller includes hardware elements that communicate with the digital signal processor by way of external conductors that are external to the digital signal processor and are different from the first and second internal busses.

18. The disk drive of claim 16, wherein the digital signal processor is devoid of an analog to digital converter, and all command signals that the digital signal processor provides to other circuits are digital command signals.

19. The disk drive of claim 16, wherein the digital signal processor is a reduced instruction set (RISC) microprocessor which requires in fewer memory access requests than if the digital signal processor were a complex instruction set (CISC) microprocessor.

20. The disk drive of claim 16, wherein the disk drive is a portable memory card that is configured to be plugged into a laptop computer.

* * * * *